US009950372B2

(12) United States Patent
Moherman et al.

(10) Patent No.: US 9,950,372 B2
(45) Date of Patent: Apr. 24, 2018

(54) TRANSPORTABLE BEVELING TOOL

(71) Applicant: Ridge Tool Company, Elyria, OH (US)

(72) Inventors: Brandon Moherman, Lakewood, OH (US); Michael J. Rutkowski, Brunswick, OH (US); Harish Prakash Kulkarni, Pune (IN); Jon R. Dunkin, Elyria, OH (US); Robert Skrjanc, Lorain, OH (US); James E. Hamm, Grafton, OH (US)

(73) Assignee: RIDGE TOOL COMPANY, Elyria, OH (US)

( * ) Notice: Subject to any disclaimer, the term of this patent is extended or adjusted under 35 U.S.C. 154(b) by 573 days.

(21) Appl. No.: 14/452,646

(22) Filed: Aug. 6, 2014

(65) Prior Publication Data

US 2015/0040731 A1    Feb. 12, 2015

Related U.S. Application Data

(60) Provisional application No. 61/863,083, filed on Aug. 7, 2013.

(30) Foreign Application Priority Data

Mar. 12, 2014    (IN) .......................... 1301/CHE/2014

(51) Int. Cl.
*B23B 5/16*    (2006.01)
*B23C 3/12*    (2006.01)
(Continued)

(52) U.S. Cl.
CPC .............. *B23B 5/161* (2013.01); *B23B 25/06* (2013.01); *B23C 3/007* (2013.01); *B23C 3/122* (2013.01);
(Continued)

(58) Field of Classification Search
CPC ....... B23B 2220/04; B23B 5/16; B23B 5/163; B23B 5/162; B23B 25/06; B23B 5/161;
(Continued)

(56) References Cited

U.S. PATENT DOCUMENTS 1,932,462 A    10/1933  Howlett
2,291,395 A     7/1942  Levey
(Continued)

FOREIGN PATENT DOCUMENTS

DE    102005043530    3/2007
EP         1211006    6/2002
WO       2015021101    2/2015

OTHER PUBLICATIONS

Chinese Office Action, Application No. 201480034812.6, dated Sep. 26, 2016 (13 pages).
(Continued)

*Primary Examiner* — Sara Addisu
(74) *Attorney, Agent, or Firm* — Mark E. Bandy; Rankin, Hill & Clark LLP

(57) ABSTRACT

Beveling tools having a variety of features are described. The tools can utilize a combination of handles, a protective external frame, guide rollers that are positionally adjusted by swing arms with timing lobes, or by an alternative guide bar mounting system, a helical knurled drive roller, guide rollers that have a convex or crowned face, skewed guide rollers, a positive clutch assembly for governing force applied to the guide rollers, a hand crank assembly for moving the tool when mounted on a workpiece, position adjustment provisions for varying the position of a milling head, and indicators providing visual feedback to an operator.

67 Claims, 15 Drawing Sheets

(51) Int. Cl.
*B23C 1/20* (2006.01)
*B23B 25/06* (2006.01)
*B23C 3/00* (2006.01)

(52) U.S. Cl.
CPC .......... *B23C 3/126* (2013.01); *B23B 2220/04* (2013.01); *B23C 2220/16* (2013.01); *B23C 2270/022* (2013.01); *Y10T 82/22* (2015.01)

(58) Field of Classification Search
CPC ..... B23C 2220/16; B23C 3/007; B23C 3/122; B23C 3/126; B23D 21/10
See application file for complete search history.

(56) References Cited

U.S. PATENT DOCUMENTS

| | | | |
|---|---|---|---|
| 2,561,484 A | 7/1951 | Shaw et al. | |
| 2,842,238 A | 7/1958 | Shaw et al. | |
| 2,915,291 A | 12/1959 | Gulfelt | |
| 3,088,352 A | 5/1963 | Tanner | |
| 3,164,062 A | 1/1965 | Hogden et al. | |
| 3,265,379 A | 8/1966 | Mighton | |
| 3,386,337 A | 6/1968 | Spier | |
| 3,501,872 A | 3/1970 | Harter | |
| 3,541,826 A | 11/1970 | Halliburton | |
| 3,691,881 A * | 9/1972 | Bachmann | B23B 5/14 82/113 |
| 3,699,828 A | 10/1972 | Piatek et al. | |
| 3,712,174 A | 1/1973 | Granfield | |
| 3,733,939 A * | 5/1973 | Paysinger | B23B 5/162 144/205 |
| 3,744,356 A | 7/1973 | Slator et al. | |
| 3,807,047 A | 4/1974 | Sherer et al. | |
| 3,850,058 A * | 11/1974 | Bachmann | B23D 21/00 82/101 |
| 3,951,018 A | 4/1976 | Gilmore | |
| 3,995,466 A | 12/1976 | Kunsman | |
| 4,144,733 A | 3/1979 | Whitten | |
| 4,180,358 A | 12/1979 | Uribe | |
| 4,207,786 A | 6/1980 | Astle et al. | |
| 4,418,591 A | 12/1983 | Astle | |
| 4,490,909 A | 1/1985 | Wachs et al. | |
| 4,625,464 A | 12/1986 | Kubo | |
| 4,633,621 A | 1/1987 | Weber | |
| 4,682,919 A | 7/1987 | Mitchell | |
| 4,689,883 A | 9/1987 | Dent | |
| 5,393,176 A | 2/1995 | Waring | |
| 5,515,756 A | 5/1996 | Sandford et al. | |
| 5,528,919 A | 6/1996 | McGrady et al. | |
| 5,641,253 A | 6/1997 | Wagner | |
| 5,730,643 A | 3/1998 | Bartlett et al. | |
| 5,961,382 A | 10/1999 | Stoloski | |
| 6,079,302 A | 6/2000 | Gudleske | |
| 6,129,488 A | 10/2000 | Fahr | |
| 6,146,067 A * | 11/2000 | Owens | B23B 5/168 30/122 |
| 6,202,522 B1 | 3/2001 | Tremblay | |
| 6,220,130 B1 | 4/2001 | Beakley | |
| 6,279,437 B1 | 8/2001 | Way | |
| 6,536,316 B2 | 3/2003 | Strait et al. | |
| 6,993,949 B2 | 2/2006 | Dole | |
| 7,082,656 B1 | 8/2006 | Duncan et al. | |
| 7,103,950 B1 | 9/2006 | Scheffer | |
| 7,270,505 B2 * | 9/2007 | VanderPol | B23C 3/122 105/29.1 |
| 7,578,643 B1 | 8/2009 | Karow | |
| 8,297,157 B1 | 10/2012 | Miller et al. | |
| 8,302,514 B2 | 11/2012 | Dole et al. | |
| 8,360,045 B2 | 1/2013 | Marsic et al. | |
| 2001/0001935 A1 * | 5/2001 | Wilk, Jr. | B23B 5/168 82/113 |
| 2004/0096287 A1 | 5/2004 | Woodrum | |
| 2004/0206218 A1 * | 10/2004 | Nybo | B23B 5/168 82/113 |
| 2008/0005907 A1 | 1/2008 | Scheffer | |
| 2009/0235532 A1 | 9/2009 | Stratford-Smith | |
| 2015/0040731 A1 | 2/2015 | Moherman et al. | |
| 2015/0321303 A1 * | 11/2015 | Esser | B23B 31/1269 82/164 |
| 2016/0207114 A1 * | 7/2016 | Lee | B23B 5/161 |

OTHER PUBLICATIONS

Search Report, Application No. 201480034812.6, dated Sep. 18, 2016 (4 pages).
International Search Report (ISR) and Written Opinion, PCT/US2014/049867, dated Dec. 8, 2014 (10 pages).
Canada—Office Action, Application No. 2914358, dated Nov. 28, 2016 (4 pages).
Chinese Office Action, Application No. 201480034812.6, dated Apr. 25, 2017 (4 pages).
German Search Report, Application No. 11 2014 003 631.5, dated Sep. 5, 2017 (10 pages).

* cited by examiner

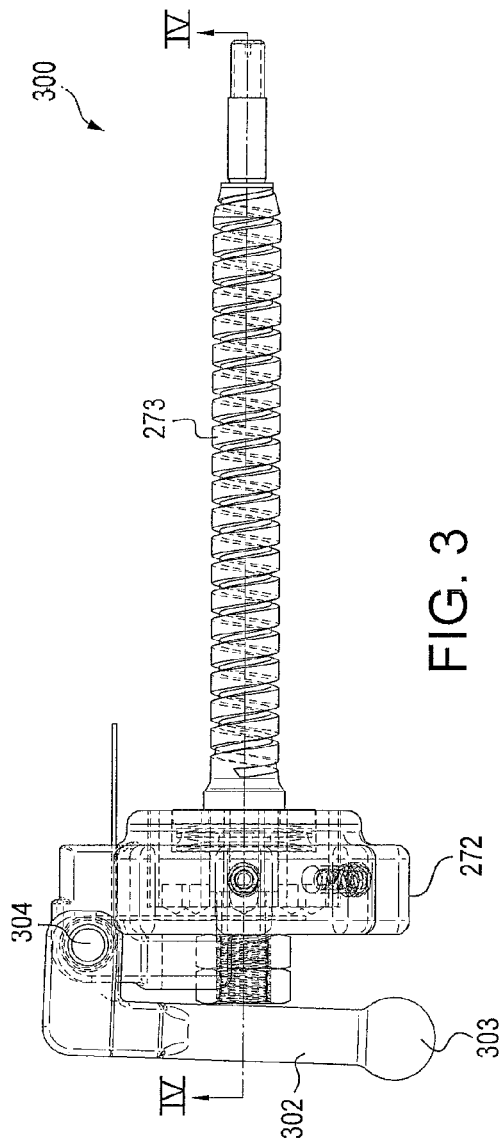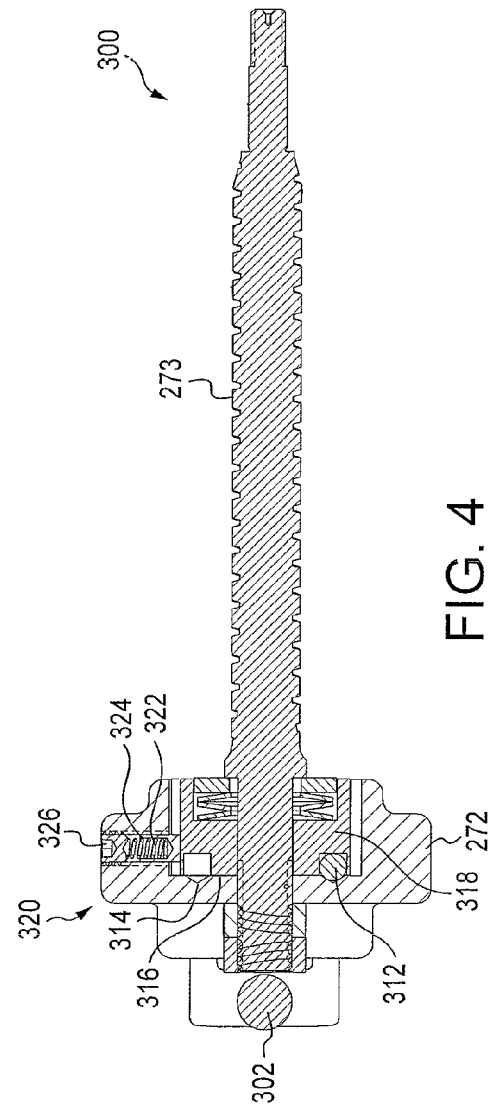

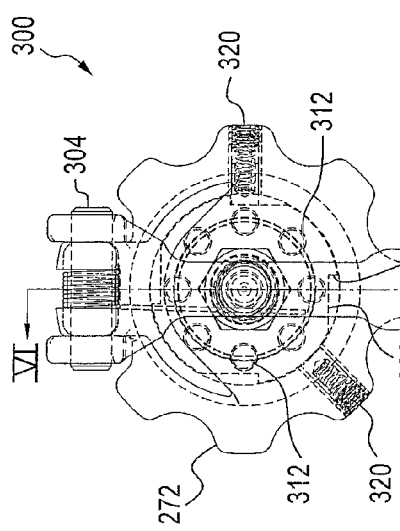
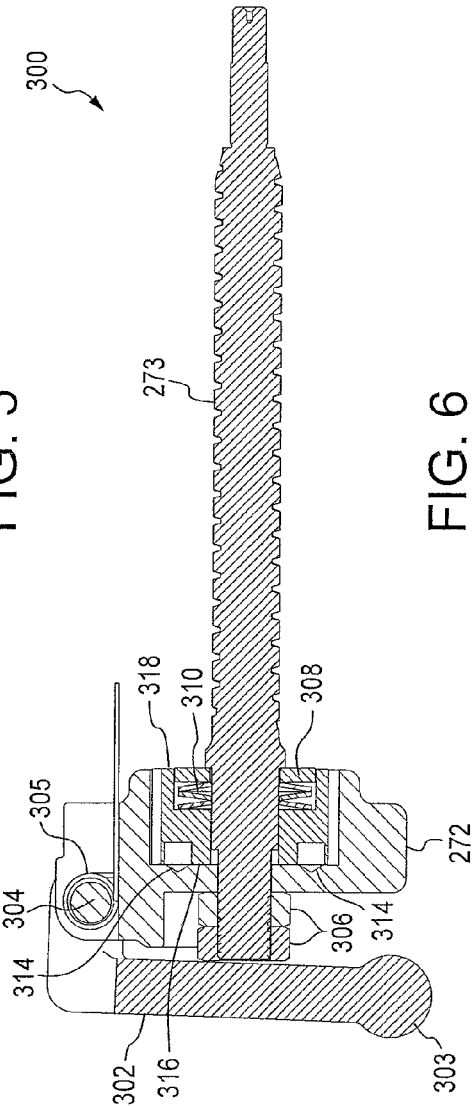
FIG. 5
FIG. 6

# TRANSPORTABLE BEVELING TOOL

CROSS REFERENCES TO RELATED APPLICATIONS

The present application claims priority upon U.S. provisional application Ser. No. 61/863,083 filed Aug. 7, 2013. The present application also claims priority upon Indian application Serial No. 1301/CHE/2014 filed Mar. 12, 2014.

FIELD

The present subject matter relates to a powered beveling tool. In particular, the subject matter relates to a beveling tool having a variety of features including improved portability.

BACKGROUND

Powered beveling tools are known in the art. Such tools typically include one or more rotary driven milling or grinding heads. The milling head is typically powered by an electric motor housed within the tool.

Beveling tools typically include engagement assemblies that enable the tool to be mounted or affixed to a workpiece such as a pipe end or sheet edge which allow the tool and workpiece to be displaced relative to one another while maintaining a desired orientation between the milling head and the workpiece.

Although a variety of such tools are known, many if not all tools suffer from one or more disadvantages. A significant disadvantage associated with many known tools is that the tools cannot be readily transported. In many instances, tools may be cumbersome or awkward to grasp, lack handles along certain regions of the tool, and be relatively heavy. Furthermore, in an attempt to reduce the weight of the tool, some manufacturers omit features and provisions that result in reduced operability of the tool.

Accordingly, a need remains for an improved beveling tool that can be easily and conveniently transported and which avoids many or all of the disadvantages of previous tools.

SUMMARY

The difficulties and drawbacks associated with previously known tools are addressed in the present apparatus and related methods of use for a beveling tool.

The present subject matter provides a powered beveling tool comprising a power unit including an electric motor. The beveling tool also comprises a frame assembly supporting the power unit. The beveling tool also comprises a faceplate engaged to the frame and defining a frontwardly directed front face. The tool additionally comprises a milling head rotatably powered by the power unit, the milling head exposed along the front face of the faceplate. The tool also comprises a guide roller assembly including a pair of guide rollers and provisions for adjustably positioning the guide rollers. The guide rollers are located along the front face of the faceplate. The tool also comprises a drive roller assembly including a drive roller and provisions for rotating the drive roller. The drive roller is located along the front face of the faceplate.

The present subject matter also provides a powered beveling tool comprising a power unit including an electric motor. The tool also comprises an external frame extending about the power unit and supporting the power unit therein. The tool additionally comprises a faceplate engaged to the frame and defining a frontwardly directed front face. And, the tool further comprises a milling head rotatably powered by the power unit. The milling head is exposed along the front face of the faceplate. The milling head comprises a frustoconically shaped head and a rearward base, and defines a centrally located and axially extending bore for receiving a drive spindle that transmits rotary power from the power unit.

The present subject matter additionally provides a powered beveling tool comprising a power unit including an electric motor. The tool also comprises an external frame extending about the power unit and supporting the power unit therein. The tool further comprises a faceplate engaged to the frame and which defines a frontwardly directed front face. The tool additionally comprises a milling head rotatably powered by the power unit. The milling head is exposed along the front face of the faceplate. The tool also comprises a drive roller assembly including a drive roller and provisions for rotating the drive roller. The drive roller is located along the front face of the faceplate. And, the tool comprises a guide roller assembly including (i) a pair of swing arms, (ii) a pair of guide rollers, each roller rotatably mounted proximate at an end of a respective swing arm, and (iii) a swing arm feed screw assembly engaged with the pair of swing arms for selectively adjusting the position of the swing arms. The swing arms are pivotally engaged with one another and the pair of guide rollers are located along the front face of the faceplate.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

FIG. 3 is an illustration of a positive clutch assembly used in the tool of FIGS. 1-2 and in accordance with the present subject matter.

FIG. 4 is a cross sectional view of the clutch assembly of FIG. 3 taken across line IV-IV in FIG. 3.

FIG. 5 is an end view of the clutch assembly of FIG. 3.

FIG. 6 is a cross sectional view of the clutch assembly of FIGS. 3-5 taken across line VI-VI in FIG. 5.

DETAILED DESCRIPTION OF THE EMBODIMENTS

Figure 1:
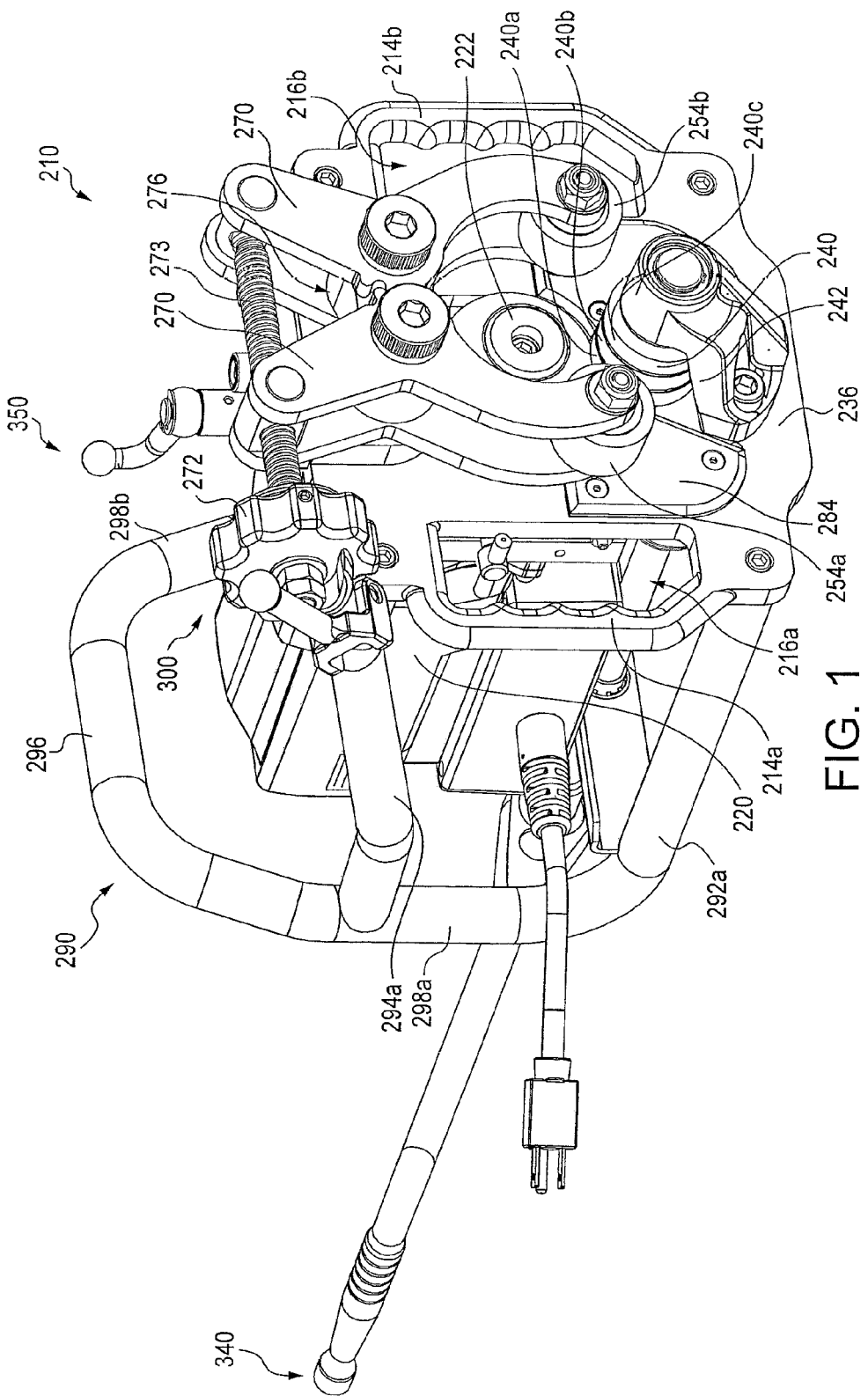
FIG. 1 is a perspective view of an embodiment of a beveling tool in accordance with the present subject matter.

Electrically powered beveling tools are described which are readily transportable. The tools comprise an external protective frame, a drive roller and selectively positionable guide rollers located near a milling head, a hand crank, and various other features and aspects.

Generally, the present subject matter provides beveling tools having one or more of the following features. FIGS. 1-9 illustrate a beveling tool 210 in accordance with the present subject matter. The tool 210 comprises a power unit 220 which drives a milling head 222 which is exposed along a frontwardly directed faceplate 236. The tool 210 also comprises a drive roller 240 also accessible along the faceplate 236. A hand crank assembly 340 is used to rotate the drive roller 240. The tool 210 additionally comprises guide rollers 254a and 254b which can be selectively positioned by a pair of swing arms 270. The swing arms are selectively positioned by a feed screw assembly 272 and may optionally include timing lobes. The tool 210 may also include an external frame assembly 290. The tool 210 can also comprise in certain embodiments a positive clutch assembly 300 described in greater detail herein, a cutter engagement feed screw assembly 350, a positionable gib plate 358 (best shown in FIG. 7), and additional features to further promote ease of use of the tool.

In certain embodiments of the present subject matter tools, one or more and particularly a set of handles are provided along the faceplate. The handles protrude from either side of the faceplate providing an operator with a location to hold onto when transporting the tool or mounting the tool to a workpiece.

Specifically, as shown in FIGS. 1, 2, 7, and 8, one or more handles are provided along a frontward region or face of the beveling tool 210. The handles can be provided laterally outward of one or more wear plates 284. In this embodiment, the faceplate 236 is configured to include a first handle 214a and a first gripping aperture 216a along a first lateral peripheral region of the faceplate. And the faceplate 236 is configured to include a second handle 214b and a second gripping aperture 216b along a second lateral peripheral region of the faceplate 236. In this embodiment, the handles 214a and 214b are integrally formed with the faceplate 236 and the gripping apertures 216a and 216b extended through the faceplate. The handles and gripping regions can be formed by casting of the faceplate. However, the present subject matter includes other methods of forming the handles and gripping apertures. For example, the present subject matter includes handles that are not cast in the faceplate, but instead are externally assembled or secured to the faceplate or tool. In the particular version shown in the referenced figures, the handles 214a, 214b and gripping apertures 216a, 216b are ergonomic and are accessible from either side of the faceplate. This placement enables an operator to readily grasp the handles and thereby hold the beveling tool when mounting the tool to a workpiece such as a pipe.

In addition to, or instead of, the handles, there is an additional carrying location(s) for the tool located on a tubular frame near a rearward region of the tool. The tubular frame provides protection for the motor, as well as a mounting point for a hand crank extension described in greater detail herein.

Specifically, the beveling tool can be provided with a variety of frames and frame configurations. In one embodiment, the beveling tool 210 comprises a frame assembly 290 having a plurality of frame members. The frame assembly 290 includes one or more base frame member(s) 292a, 292b, one or more intermediate frame member(s) 294a, 294b, an upper frame member 296, and one or more vertical frame member(s) 298a, 298b. The vertical frame member(s) 298a, 298b extend between and are engaged to the base frame member(s) 292a, 292b, the intermediate frame member(s) 294a, 294b, and the upper frame member 296. The vertical frame member(s) include a first vertical frame member 298a along one side or region of the tool 210, and a second vertical frame member 298b along another side or region of the tool 210. Similarly, the base frame member(s) include a first base frame member 292a on one side of the tool and a second base frame member 292b along another side of the tool. Likewise, the intermediate frame member(s) include a first intermediate frame member 294a on one side of the tool and a second intermediate frame member 294b along another side of the tool.

As noted, the present subject matter provides a wide array of shapes and configurations for the frame assembly 290. In the particular embodiment depicted in the referenced figures, the base frame members 292a and 292b each extend along a lower side region of the beveling tool 210 and between the faceplate 236 and a rearward portion of the power unit 220 and the vertical frame members 298a and 298b. The intermediate frame members 294a and 294b each extend along an intermediate side region of the beveling tool 210 and between the faceplate 236 and the vertical frame members 298a and 298b. The upper frame member 296 extends between the vertical frame members 298a and 298b. In many versions of the frame assembly, the various frame members are affixed to one another and/or integrally formed with one another. It may also be beneficial to provide rounded or acuate transition regions between adjacent frame members.

In the particular frame assembly 290 depicted in the referenced figures, the base frame members 292a and 292b are parallel to one another and generally extend perpendicular to the vertical frame members 298a and 298b. The intermediate frame members 294a and 294b, or at least a major length portion thereof, extend at an angle with respect to corresponding base frame members 292.

Many or all of the frame members provide gripping regions along their outer surface to facilitate transport and/or positioning of the beveling tool. The frame assembly, as will be appreciated, provides support and stability for the components of the beveling tool.

In certain embodiments, one or more components of the frame assembly 290 are in the form of tubes. A tubular frame is relatively lightweight and provides excellent strength and rigidity for the resulting assembly. The frame assembly 290 also provides protection for components of the beveling tool 210 and particularly for the power unit 220. And, in certain versions, the frame assembly provides mounting or access provisions for a hand crank assembly described in greater detail herein.

In certain embodiments, timing lobes are provided between the swing arms to prevent misalignment within a four point linkage and ensure parallel movement between the guide rollers. Swing arm misalignment prevents consistent tracking and will create additional unwanted stress. The swing arms 270 include timing lobes collectively shown as 276 in FIG. 1.

Figure 8:
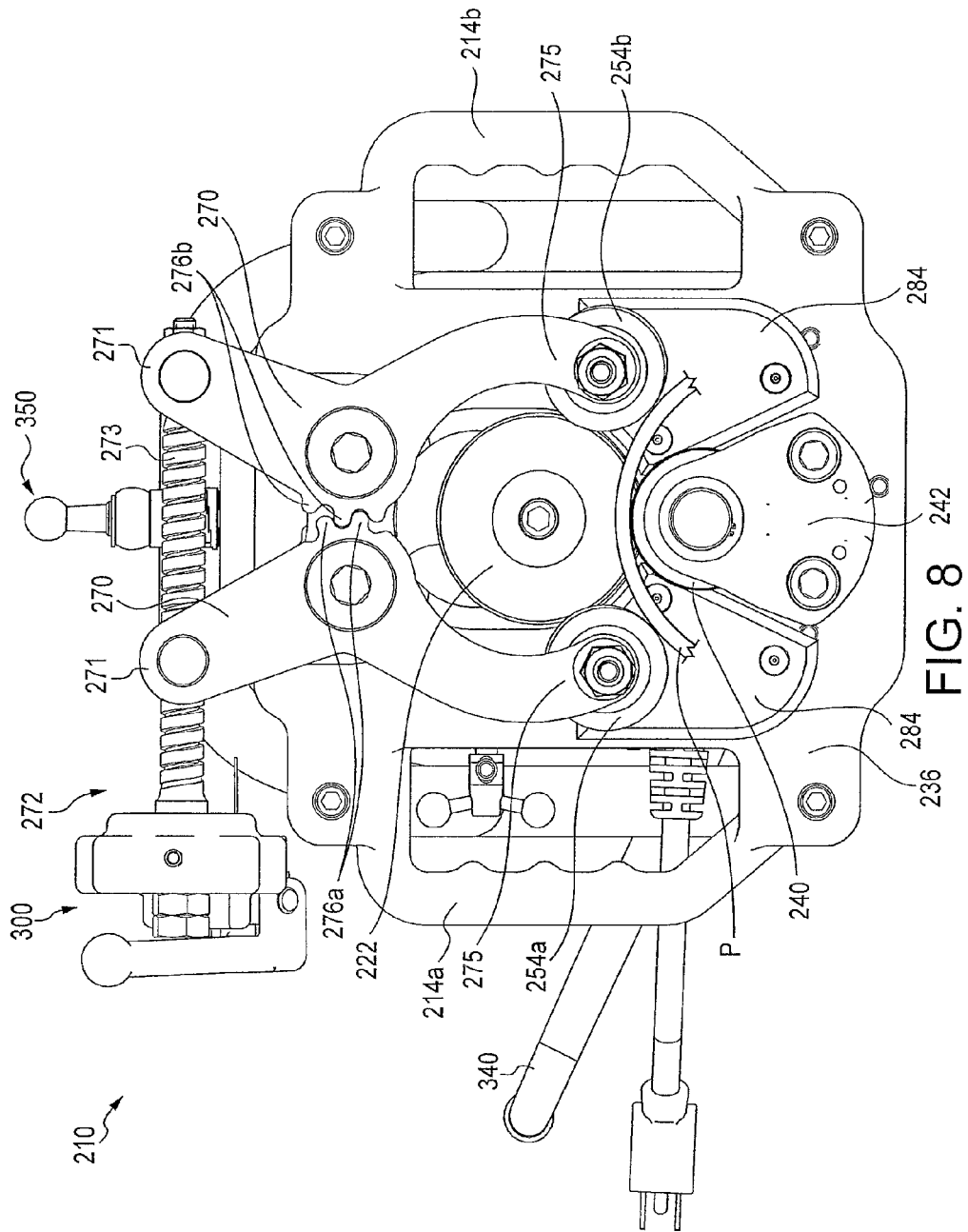
FIG. 8 is a front end view of the beveling tool of FIGS. 1-7.

Specifically, the swing arms 270 are best illustrated in FIGS. 1 and 8. Each swing arm includes a first end 271 and a second end 275. The guide rollers 254a, 254b are rotatably affixed to the second ends 275 of the swing arms 270. As will be appreciated, rotation of a threaded member 273 results in linear displacement of the first ends 271 of the swing arms 270 engaged therewith. Thus, upon rotation of the threaded member 273 in one direction, the first ends 271 of the swing arms 270 are displaced toward one another, thereby resulting in displacement of the second ends 275 away from one another. And, upon rotation of the threaded member 273 in an opposite direction, the first ends 271 of the swing arms 270 are displaced away from one another, thereby resulting in displacement of the second ends 275 toward one another. It will be appreciated that this arrangement could be reversed.

Each swing arm 270 includes one or more timing lobes 276 as best shown in FIG. 8. Specifically, the swing arm 270 carrying the guide roller 254a includes one or more timing lobes 276a. And the swing arm 270 carrying the guide roller 254b includes one or more timing lobes 276b. The timing lobes 276a and 276b are directed toward and facing one another. Each timing lobe 276a is separated by a recessed region that is sized and shaped to receive and engage one of the timing lobes 276b. And, each timing lobe 276b is separated by a recessed region that is sized and shaped to receive and engage one of the timing lobes 276a. The timing lobes 276a, 276b engage one another in a meshed gear engagement fashion and function to promote symmetrical positioning between the swing arms 270. Although the timing lobes 276 are utilized in the tool 210, it will be appreciated that the present subject matter includes a wide array of assemblies and configurations for governing movement of the swing arms. Furthermore, the present subject matter includes beveling tools that do not utilize timing lobes or any such provisions for governing movement of the swing arms.

Consistent tracking of the tool along an edge of a workpiece is a significant feature of the tool. The present subject matter provides several configurations for a drive roller to promote such tracking. In certain embodiments, a single diameter drive roller having a 60° helical knurl is utilized. A 60° helix angle has been found to provide beneficial results. The noted angle(s) is with regard to the axis of rotation of the drive roller. However, the present subject matter includes the use of other knurls and knurling patterns including helical knurls with other angles such as from about 10° to about 80°, and more particularly from 45° to 70°. In certain embodiments, a stepped knurled drive roller is provided that in many embodiments is imprinted or otherwise formed with a diamond knurling pattern to grip the material and drive the tool along an edge of the workpiece. The stepped configuration can be provided in three sequential or adjacent circumferential regions, with the largest diameter located closest to the faceplate. The largest diameter ring moves with an angular velocity greater than the smallest diameter ring. The difference in the surface speeds of the different steps urges the tool to track during operation. The drive roller accomplishes this tracking by rotating the tool axially in a clockwise direction, effectively forcing the leading edge of the tool into the workpiece.

Specifically, the stepped knurled drive roller 240 includes a plurality of regions, each differing in diameter, and concentrically arranged about a common central axis of rotation. As noted, the region having the largest diameter is positioned immediately adjacent to the faceplate 236. This first region of the drive roller 240 is shown in FIG. 1 as region 240a. A second region 240b is provided adjacent to the first region 240a such that the first region 240a is disposed between the faceplate 236 and the second region 240b. The diameter of the second region 240b is less than that of the first region 240a. The drive roller 240 can include a third region 240c. The first region 240a and the second region 240b are disposed between the faceplate 236 and the third region 240c. The diameter of the third region 240c is less than that of the second region 240b. The drive roller 240 is supported by support 242 as shown in FIG. 1. The present subject matter includes a wide array of configurations for the drive roller 240. For example, the number of steps or regions can be greater than three, or less than three. Although the drive roller 240 is described as having a plurality of diametrical sections, it will be understood that the drive roller 240 could be in the form of a single diameter roller. Furthermore, it is also contemplated that the drive roller 240 could be provided in non-cylindrical shapes and forms for example having a cone or frusto-conical shape. Furthermore, the drive roller 240 can include a wide range of knurling patterns. It is contemplated that nearly any surface roughening or modification technique can be used to increase friction or gripping between the guide roller and a workpiece. For example, as previously noted helical knurling pattern(s) could be formed or produced on the drive roller. Alternatively, a combination of a helical knurling pattern and a diamond knurling pattern could be used.

Upon mounting the tool to a workpiece, due to a majority of the tool's weight being cantilevered off the edge of the workpiece, there may be a need for other means of tracking. In certain applications, in order to provide the additional force needed for consistent tracking, the track or guide rollers are crowned and skewed at a predetermined angle.

Figure 2:
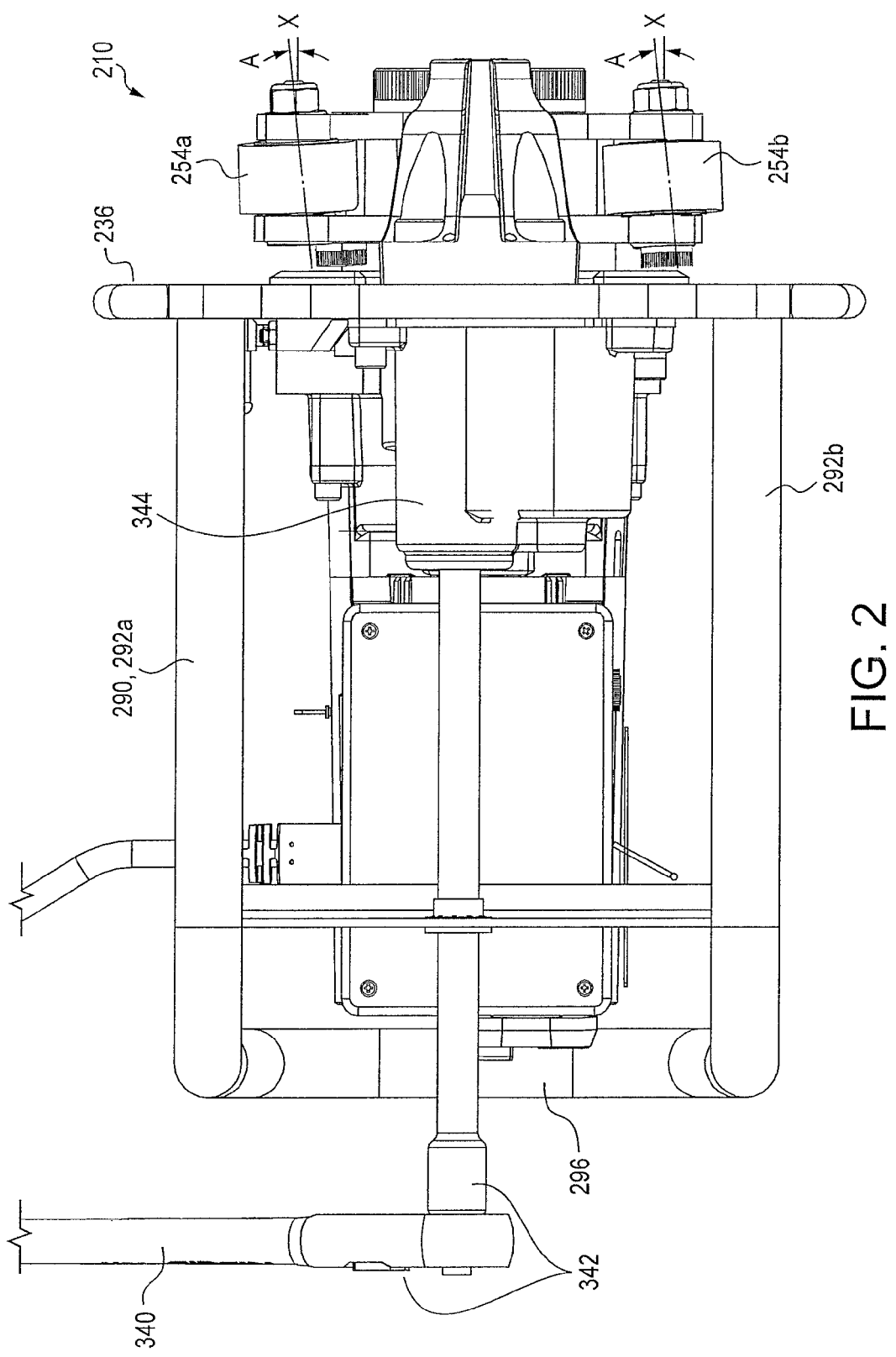
FIG. 2 is an underside planar view of the beveling tool of FIG. 1.

More specifically, in certain embodiments of the present subject matter, the guide rollers 254a, 254b, are skewed to facilitate or further promote tracking between the tool 210 and a workpiece placed therein. The terms "skewed" as used herein refers to positioning each of the guide rollers 254a, 254b such that they rotate along axes of rotation that are not perpendicular to the faceplate 236, or more particularly to an outwardly directed front surface of the faceplate 236. Referring to FIG. 2, the underside of the beveling tool 210 is shown. Each guide roller 254a and 254b rotates about an axis X. Axis X diverges from a perpendicular line extending from the faceplate 236 by an angle A. For many embodiments of the present subject matter, angle A is an angle within a range of from about 0.1° to about 10°, and particularly from 1° to 5°.

In certain embodiments, each of the guide rollers 254a and 254b is "crowned." The term "crowned" as used herein refers to the profile of the face of each guide roller that contacts a workpiece, having a convex shape. The convex shape is seen in a cross-section of the guide roller taken along a plane extending along the axis of rotation of the guide roller. Thus, in such embodiments the face of the guide rollers 254 is not flat. Instead, a convex shape reduces the potential for contact between a workpiece and an outer circular edge of a guide roller 254a, 254b. However, in other embodiments, the present subject matter includes the use of guide rollers having faces that are flat. In those embodiments, the guide rollers are cylindrical in shape and so when viewed in the noted cross section, their face which contacts a workpiece is flat or substantially so.

In many instances of tool use, there is a torque requirement needed for the swing arm feed screw to ensure sufficient contact force between the crowned track rollers and the single diameter drive roller with a helical knurl or the stepped knurl drive roller. To ensure or promote proper torque is being applied to the feed screw while the tool is mounted to the workpiece, a positive clutch can be used in association with the feed screw. The positive clutch has an associated spring return lever to provide an operator with an additional moment arm, which is needed to apply the required torque. Other methods and/or provisions could be used to apply the requisite torque. For example, hand tightening followed by an additional half turn using a wrench could be performed. Alternatively or in addition a torque wrench could be used.

More specifically, the positive clutch assembly 300 is illustrated in FIGS. 1 and 3-6. The clutch assembly 300 is incorporated with the adjusting feed screw assembly 272 and the threaded member 273 that threadedly engages the swing arms 270. As noted, the positive clutch assembly 300 facilitates application of sufficient torque to the threaded member 273 in order to linearly displace the swing arms 270 threadedly engaged thereto. The clutch assembly 300 includes a spring return lever 302 that can be pivoted about a pivot member 304 from its retracted position shown in the referenced figures to an extended position. When the spring return lever 302 is extended, its distal end 303 is swung outward a distance away from the axis of rotation of the threaded member 273 to thereby provide an increased moment arm for an operator. Thus, upon extending the lever 302 an operator can readily apply a greater level of torque than if the lever 302 was retracted and the operator was grasping the adjustment knob of the feed screw assembly 272. A biasing means such as a torsion spring 305 shown in FIG. 6 can be provided to bias the lever 302 to a particular position such as the retracted position shown in the figures. The present subject matter includes a variety of handle types, configurations, and assemblies which can be used instead of, or in addition to, the lever 302. For example, sliding handle assemblies could be used. A detachable handle or handle assembly could be used. A knob or other gripping member could be used instead of, or in addition to, the lever 302.

The clutch is retained together with two retaining nuts on one end and a hardened washer on the opposite end. The retaining nuts adjust the spring force of one or more Belleville disc springs. The spring force is used to determine the force required before the clutch slips. When the clutch slips, a collection of hardened balls 312 roll over the edge of drill points machined into a hand flange. To ensure that the clutch does not slip when the feed screw is loosened there are steps along the outer diameter of an inner race for a spring-loaded pawl to press against.

Specifically, the positive clutch assembly 300 also includes retaining provisions such as retaining nuts 306 and a base plate or washer 308 and force provisions 310 as shown in FIG. 6. The retaining provisions can be used to adjust the force of the force provisions 310. In certain embodiments, the force provisions 310 are in the form of a Belleville disc spring, however the present subject matter provides other spring configurations and/or spring components for the force provisions 310. For example, a variety of springs and/or spring assemblies could be used instead of, or in addition to, the noted Belleville spring, such as a die spring or compression spring. The spring force provided by the force provisions 310 determines the force required before the clutch slips. For example, at a particular clutch setting determined by the retaining provisions 306 and the force provisions 310, rotation of the threaded member 273 by either of the lever 302 or the adjustment knob to which the lever 302 is attached, results in linear displacement of the swing arms relative to each other. Application of a rotary force to the threaded member 273 greater than the clutch setting results in the clutch slipping thereby preventing linear displacement of the swing arms. When the clutch slips, one or more hardened clutch balls 312 are displaced from recessed regions 314 which can be formed by drilling or otherwise machining recessed regions along an interior face 316 of the adjustment knob of the feed screw assembly 272. As will be understood from FIGS. 4 and 6, the recessed regions 314 are sized and shaped such that a corresponding clutch ball 312 when positioned in the recess 314, is only partially seated therein. Thus, the maximum size of a recess 314 is less than the diameter of a clutch ball. With further reference to FIGS. 4 and 6, it will be understood that upon unseating of a clutch ball 312 from its recess 314, an inner clutch plate 318 is axially separated from the interior face 316 of the adjustment knob of the feed screw assembly 272.

In order to loosen the feed screw assembly 272, a plurality of radially positionable and radially biased pawls 320 are provided. Referring to FIG. 4, each pawl or pawl assembly includes a radially positionable pawl member 322 that is slideably received within a bore in the adjustment knob of the feed screw assembly 272. Each pawl is urged radially inward by biasing means such as a compression spring 324 retained within the bore and adjusted by a set screw 326. Each pawl member 322 is urged into contact with the inner clutch plate 318 and in particular, with circumferentially disposed steps 328 as shown in FIG. 5, each providing a step face 330 for contacting a pawl member 322. The inner clutch plate 318 can be provided with a plurality of steps 328. The steps are defined equidistant from one another about the perimeter of the clutch plate 318. Upon rotation of the hand knob of the feed screw adjustment assembly 272 in a direction corresponding to loosening of the feed screw assembly each pawl member 322 contacts a corresponding step face 330 and thus rotary movement of the hand knob is transferred to the threaded member 273 via the inner clutch plate 318. Upon tightening the feed screw assembly, the pawl members can pass over each of the steps 328. Upon loosening the feed screw assembly, the pawl members contact the step faces 330.

The tool can be manually driven around a pipe by an operator with a hand crank. In many embodiments the hand crank or a hand crank assembly is releasably engageable with the beveling tool. The hand crank is connected to a hand crank extension which transmits rotary motion through a reduced speed hand crank gear box before connecting to the drive roller. Upon rotation of the hand crank, the drive roller is rotated. A one-way clutch bearing rides along the input shaft, which prevents the user from driving the tool in the wrong direction. The one-way clutch bearing could be of a ratchet type design to allow only one rotational direction. The present subject matter also includes the use of motorized or powered drives instead of, or in addition to, the hand crank. For example, an electric motor could be used to power rotation of the drive roller.

Specifically, the beveling tool 210 also comprises a hand crank assembly 340 including a hand crank extension assembly 342 and a reducing gear assembly 344. The gear assembly 344 rotates the drive roller 240. The hand crank extension assembly 342 includes one or more members for transferring rotary movement or power to the gear assembly 344. The assembly 342 typically includes a ratcheting wrench or other component to facilitate an operator applying rotary power to the gear assembly 344. One or more movement controlling provisions such as a one-way clutch bearing can be used in the gear drivetrain or the extension assembly 342 to prevent a user from driving the tool 210 in an improper direction. The present subject matter also includes the use of quick release assemblies for engaging the hand crank, ratcheting wrench, drive motor, or other component(s) to the gear assembly 344. For example, a nonlimiting example of a quick release assembly is the assembly disclosed in U.S. provisional application Ser. No. 61/896,174 filed Oct. 28, 2013.

FIG. 8 also depicts a portion of a workpiece P positioned between the drive roller 240 and the guide rollers 254a and 254b. Typically, for applications in which the workpiece P is a pipe or other arcuate member, the drive roller 240 is positioned along one face such as an interior surface, and the guide rollers 254a and 254b are positioned along an opposite face such as an outer face. It will be understood that workpiece P can be in other shapes and include non-cylindrical shapes.

Figure 9:
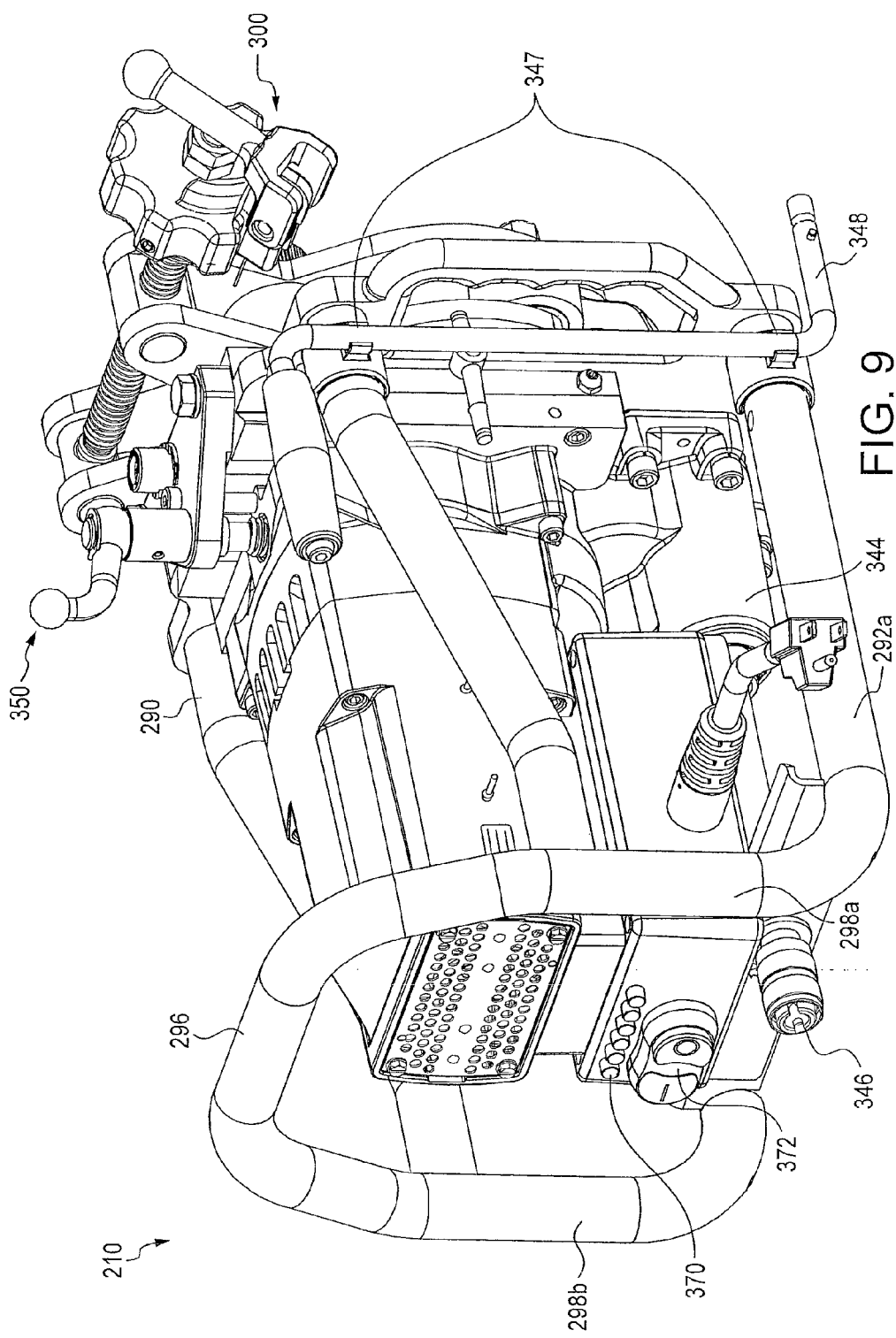
FIG. 9 is another perspective view of the beveling tool of FIGS. 1-8.

FIG. 9 illustrates the tool 210 having a quick release or "quick disconnect" assembly 346 at which a drive such as a hand crank can be engaged for applying rotary power to the gear assembly 344 and the drive roller 240. The quick disconnect assembly 346 is located along a region of the tool 210 to provide an operator with a convenient location for attaching a drive component. For certain embodiments, a detachable hand crank 348 is provided which includes an end configured for engagement with the quick disconnect assembly 346. One or more mounting brackets 347 can be provided on the tool to retain and/or store the hand crank 348 when detached or disengaged from the assembly 346. This version of the tool 210 as depicted in FIG. 9 in which the hand crank is disengaged enables an operator to position or orient the tool 210 such that the faceplate 236 and milling head 222 are directed or facing upwards. This orientation provides convenient access for an operator for installation of new or replacement milling heads and/or cutting inserts.

As previously noted, a powered drive such as a secondary variable speed motor can be engaged with the drive roller 240, and particularly via the quick disconnect assembly 346. This provides an operator with an option of using motorized driving of the tool. That is, if the operator would prefer to power the tool around a pipe or other workpiece rather than manually driving the tool by use of the hand crank 348 or wrench, the quick disconnect assembly 346 provides a convenient and readily accessible location for attachment of a motor, crank, or wrench.

In certain embodiments, the power unit or motor sub-assembly is vertically positionable along dovetail rail guides with a cutter engagement feed screw. A stepped land-width adjustment can be used to control the amount of travel the tool can move downward. After a shoulder screw bottoms out, a gib plate locking screw is tightened against the gib plate in order to hold the motor sub-assembly fixed during milling.

Figure 7:
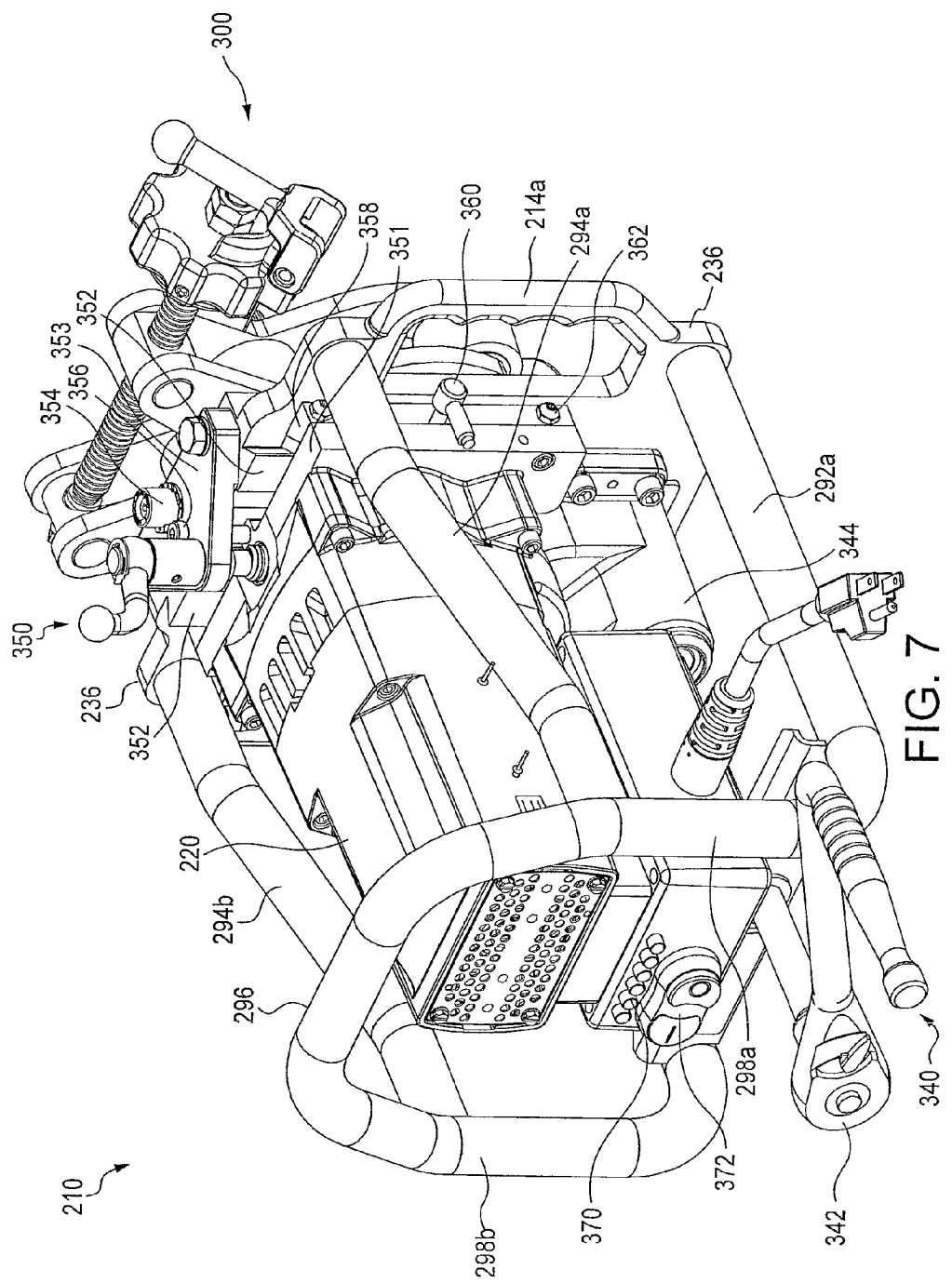
FIG. 7 is another perspective view of the beveling tool of FIGS. 1-6.

More specifically, in certain embodiments of the tool, provisions for selectively positioning the milling head 222 are provided in the tool 210. For example and as depicted in FIG. 7, the power unit 220 and milling head 222 are selectively vertically positioned along the faceplate 236 by adjustment of a cutter engagement feed screw assembly 350. One or more dovetail rail guides 352 can be provided along a rear face or portion of the faceplate 236 which serve to limit lateral or other movement besides vertical movement between the power unit 220 and the faceplate 236. The feed screw assembly 350 includes a threaded longitudinal member that is threadedly engaged with a front frame face 351 secured to the power unit 220. The feed screw assembly 350 is mounted or otherwise affixed with an upper mounting plate 353 to which the faceplate 236 is affixed. As will be understood, upon rotation of the threaded longitudinal member of the feed screw assembly 350, the front frame face 351 and the mounting plate 353 and faceplate 236 are displaced away from or toward one another: The dovetail rail guides 352 guide movement between the front frame face 351 and the mounting plate 353. A stepped land width adjustment assembly 354 can be used to control the extent of vertical movement and particularly provide an end stop for movement of the power unit 220 relative to the faceplate 236. A shoulder screw 356 can be used to limit vertical displacement and particularly that of the power unit 220 or a gib plate 358 to which the power unit 220 is movably affixed. Specifically, the stepped land width adjustment 354 includes a rotatable knob having a collection of raised regions around its outer periphery. Each raised region can be positioned under the shoulder screw 356 by selective rotation of the knob. Varying dimensions of clearance between the shoulder screw 356 and the raised regions provide varying dimensions of vertical movement between the power unit 220 and the faceplate 236. A gib plate locking screw 360 is utilized that engages the gib plate 358 to the faceplate 236 during milling or other operation. Upon selection of a desired position for the milling head 222, the gib plate locking screw 360 is tightened to maintain that position. The gib plate locking screw 360 can be provided in a wide array of configurations to enable engagement between the gib plate 358 and the faceplate 236. One possible configuration is a cam shaped head for the locking screw 360 which can be frictionally engaged against the faceplate 236. One or more gib plate fine adjustment screws such as screws 362 can be provided along the gib plate 358 to provide relatively fine positional adjustment of the milling head 222 relative to the faceplate 236.

The beveling tool 210 can include a wide array of features and the like. A current draw indicator such as an LED display 370 can be provided to assist an operator in controlling the rate of feed to the milling head 222, i.e., the rate of travel between the tool and the workpiece which is the result of the operator applying power via the hand crank assembly 340. A wide array of indicators can be used for the display 370 including different color LEDs or certain arrangements to indicate to an operator whether to reduce or increase the feed rate.

The beveling tool 210 may also include an on/off switch 372 which can be in a variety of different forms and configurations. Biasing provisions can be used to urge the switch to a desired position depending upon the motor actuation circuit.

Figure 12:
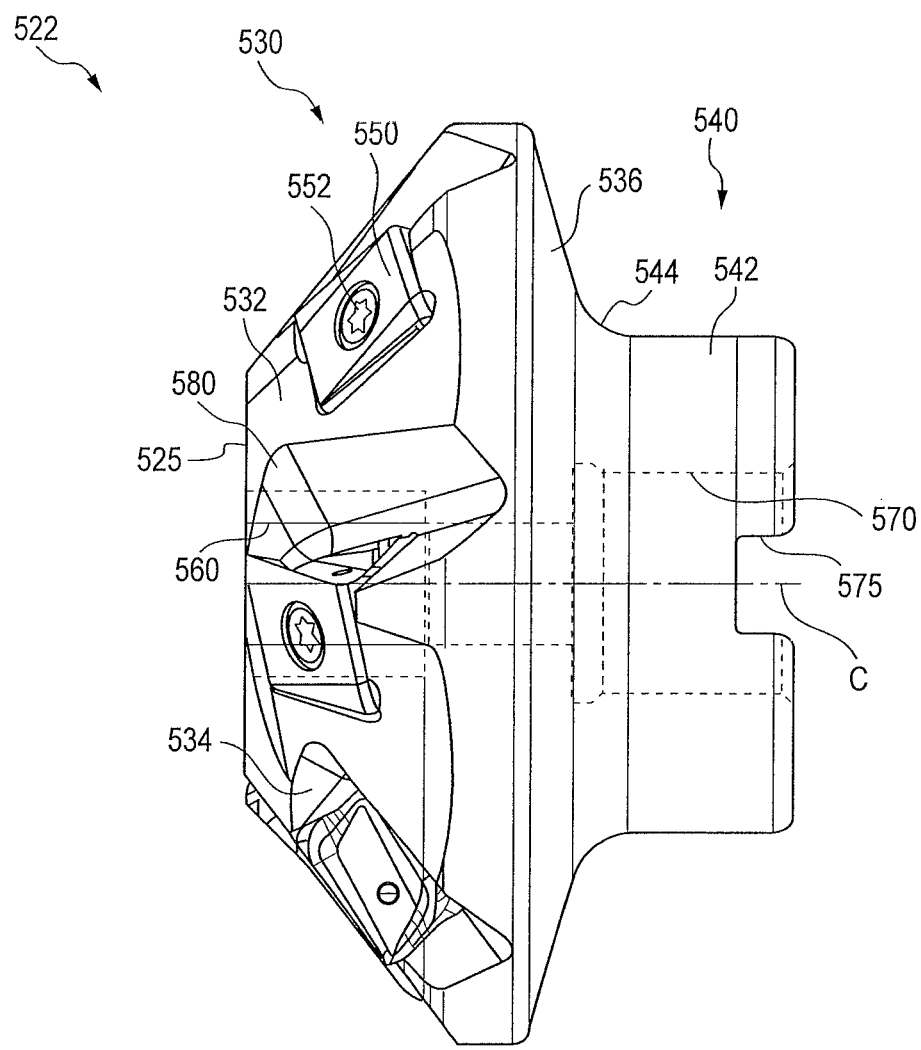
FIG. 12 is a side elevational view of an embodiment of a milling head with inserts in accordance with the present subject matter.
Figure 13:
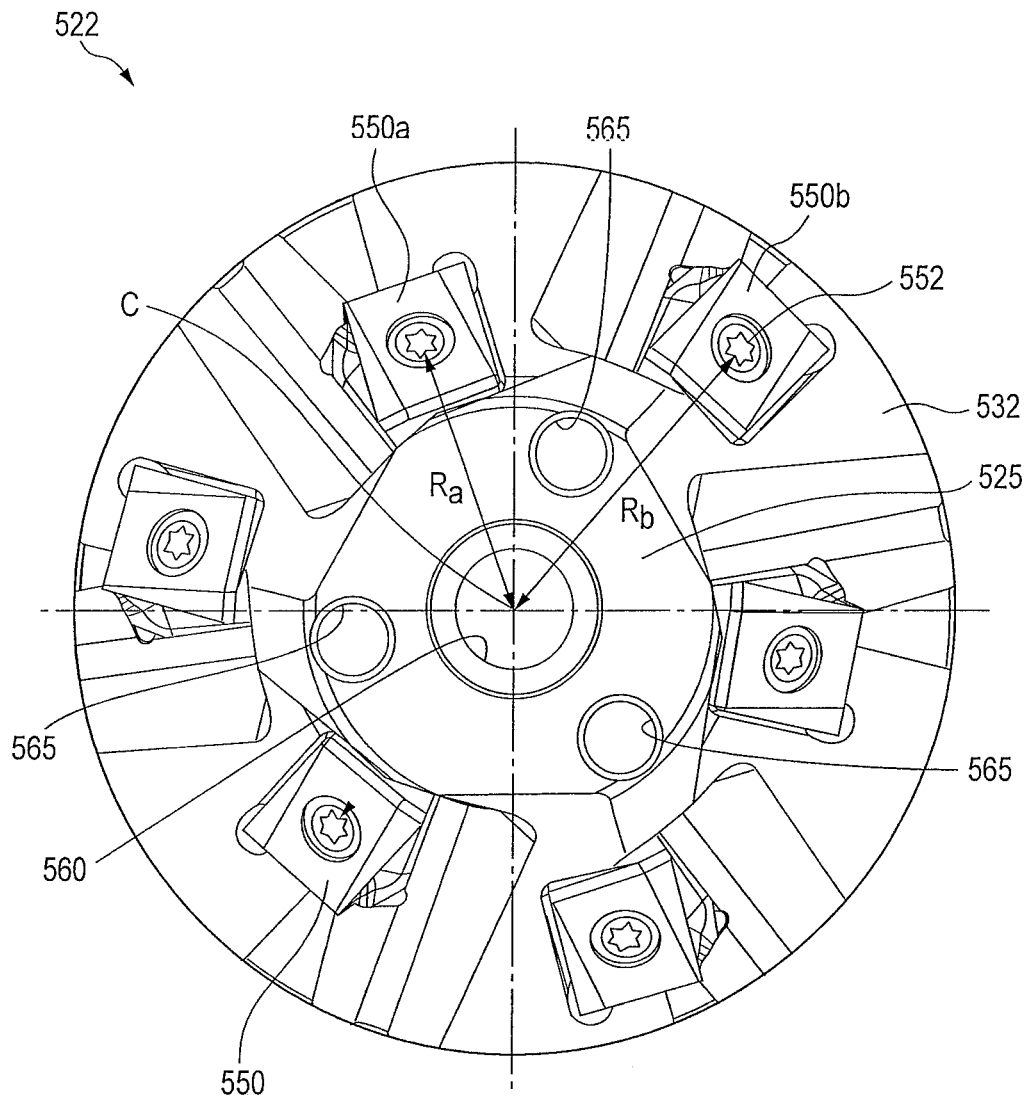
FIG. 13 is a front elevational view of the milling head and inserts illustrated in FIG. 12.

FIGS. 12 and 13 illustrate a particular embodiment of a milling head 522 in accordance with the present subject matter. The milling head 522 depicted in FIGS. 12 and 13 comprises a generally frustoconically shaped head 530 and a rearward base 540 affixed or integrally formed therewith. Upon incorporation in a beveling tool, such as the beveling tool 210 shown in FIGS. 1-9, the head 530 is directed outward and is exposed along the faceplate 236.

The head 530 defines a frontwardly directed sloped surface 532 that generally borders or circumscribes a front face 525. The head 530 includes provisions for retaining one or more milling or cutting inserts 550. The retention provisions can be in the form of recesses or depressions 534 accessible along the surface 532. As shown in FIGS. 12 and 13, the milling or cutting inserts 550 are typically arranged along the sloped surface 532 of the head 530. One or more fasteners 552 or other securing means can be used to selectively retain or secure an insert 550 to the head 530, and particularly in a corresponding recess 534. In particular versions of the milling head 522, the insert securing means and/or the inserts 550 are arranged along the front of the head 530 such that a portion of the inserts are radially offset relative to one or more other inserts. For example, referring to FIG. 13, a radial distance $R_a$ of one or more inserts 550 such as insert 550a as measured from a center C of the milling head 522 to a center of the insert 550a, is different than a radial distance $R_b$ of one or more other inserts 550 such as insert 550b as measured from the center C to a center of the insert 550b. In this example, $R_a$ is less than $R_b$. More than one insert 550 may be offset such as shown in FIG. 13. Offsetting the inserts across the cutting length promotes fragmentation of any resulting metal chip(s) that may be generated during a beveling operation. The offset configuration also reduces the amount of torque needed as compared to a configuration with one insert per length of cut; again an advantage when working with limited horsepower. By distributing the chip load and reducing the forces required for beveling, vibration is also reduced, which is particularly desirable for a transportable tool.

The base 540 can be in a variety of shapes and configurations. However, in the embodiment depicted in FIGS. 12-13, the base 540 is integrally formed with the head 530, and is cylindrical and defines an outer circumferential surface 542. A sloping rear face 536 defined by the head 530 merges with the circumferential surface 542 along an arcuate transition region 544.

The milling head 522 defines a centrally located and axially extending bore extending through the head 530 and the base 540. The bore includes a frontward portion 560 generally extending within the head 530 and a rearward portion 570 extending within the base 540. The bore extends along the center axis C of the milling head 522. In certain versions, the portions 560 and 570 are cylindrical. And in particular versions of the milling head, the frontward portion 560 has a smaller diameter than that of the rearward portion 570. One or more keyways such as keyway 575 can be provided with either or both of the bore portions 560, 570 for engagement with dowel pins or keys on a drive spindle (not shown).

The milling head 522 can be secured to a rotatable drive spindle (not shown) by a variety of means. In the particular embodiment of FIGS. 12-13, the milling head 522 includes a clearance bore 580 defined along the head 530 and particularly in association with one or more recess(es) 534. The clearance bore 580 can receive a fastener or other member for engaging a drive spindle.

The milling head 522 also includes provisions for conveniently grasping, engaging, and/or holding the milling head 522 in a stationary position. This is useful when applying torque to mounting screws that engage the milling head 522 to a drive spindle (not shown). These provisions can be in the form of at least two (2), and particularly three (3) equidistantly arranged apertures 565 which are accessible along the front of the head 530 and particularly along the front face 525. The apertures 565 are spaced apart from one another to receive a conventional two pin spanner wrench. Upon engagement with such wrench, an operator can securely hold the milling head 522 and prevent rotation.

FIGS. 14-17 illustrate a beveling tool 610 in accordance with the present subject matter. The tool 610 comprises a power unit 620 which drives a milling head 622 which is exposed along a frontwardly directed faceplate 636. The tool 610 also comprises a drive roller 640 also accessible along the faceplate 636. A hand crank assembly 740 is used to rotate the drive roller 640. The tool 610 additionally comprises guide rollers 654a and 654b which can be selectively positioned by a pair of swing arms 670. The swing arms are selectively positioned by a feed screw assembly 672 and may optionally include timing lobes 676. The tool 610 may also include an external frame assembly 690. The tool 610 can also comprise a cutter engagement feed screw assembly 750, a positionable gib plate 658 (best shown in FIG. 16), and additional features to further promote ease of use of the tool. As previously described, a workpiece P is also shown.

Specifically, one or more handles are provided along the tubular frame near a rearward region and a frontward region of the tool. The tubular frame provides protection for the motor, as well as a mounting point for a hand crank extension described in greater detail herein.

Specifically, the beveling tool can be provided with a variety of frames and frame configurations. In one embodiment, the beveling tool 610 comprises a frame assembly 690 having a plurality of frame members. The frame assembly 690 includes one or more base frame member(s) 692a, 692b, one or more intermediate frame member(s) 694a, 694b, one or more upper frame member(s) 696a, 696b, and one or more vertical frame member(s) 698a, 698b. The vertical frame member(s) 698a, 698b extend between and are engaged to the base frame member(s) 692a, 692b, the intermediate frame member(s) 694a, 694b, and the upper frame member(s) 696a, 696b. The vertical frame member(s) include a first vertical frame member 698a along one side or region of the tool 610, and a second vertical frame member 698b along another side or region of the tool 610. Similarly, the base frame member(s) include a first base frame member 692a on one side of the tool and a second base frame member 692b along another side of the tool. Likewise, the intermediate frame member(s) include a first intermediate frame member 694a on one side of the tool and a second intermediate frame member 694b along another side of the tool.

As noted, the present subject matter provides a wide array of shapes and configurations for the frame assembly 690. In the particular embodiment depicted in the referenced figures, the base frame members 692a and 692b each extend along a lower side region of the beveling tool 610 and between the faceplate 636 and a rearward portion of the power unit 620 and the vertical frame members 698a and 698b. The intermediate frame members 694a and 694b each extend along an intermediate side region of the beveling tool 610 and between the faceplate 636 and the vertical frame members 698a and 698b. The upper frame members 696a and 696b extend between the vertical frame members 698a and 698b and/or the intermediate frame members 694a and 694b. In many versions of the frame assembly, the various frame members are affixed to one another and/or integrally formed with one another. It may also be beneficial to provide rounded or actuate transition regions between adjacent frame members.

In the particular frame assembly 690 depicted in the referenced figures, the base frame members 692a and 692b are parallel to one another and generally extend perpendicular to the vertical frame members 698a and 698b. The intermediate frame members 694a and 694b, or at least a major length portion thereof, extend at an angle with respect to corresponding base frame members 692a and 692b.

Many or all of the frame members provide gripping regions or handles along their outer surface to facilitate transport and/or positioning of the beveling tool. The frame assembly, as will be appreciated, provides support and stability for the components of the beveling tool. In the particular embodiment depicted in FIGS. 14-17, the beveling tool 610 utilizes a frame assembly 690 having at least one and particularly two upwardly directed handles provided by frame members 696a and 696b. This handle configuration serves two main functions. This configuration is referred to herein as a "side and rear mount" handle configuration and allows an operator to hold the tool from above with one hand near the rear of the tool and one hand near the front of the tool. From there, the operator can mount the tool to the work piece while standing along a side of the tool. This mounting position allows the user to have visibility along the front of the tool while mounting. This feature compliments the angled intermediate frame members 694a and 694b, which provide the operator an option of mounting the tool while standing at the rear. A second function of this handle configuration is for providing protection. A forward-most part of the handle 696a protects the screw assembly 672 and the swing arms 670 from damage due to dropping. Also, the vertical position of the handle 696a relative to the rear handle 696b protects all the components on the top side of the tool; which includes the screw assembly 672.

In certain embodiments, one or more components of the frame assembly 690 are in the form of tubes. A tubular frame is relatively lightweight and provides excellent strength and rigidity for the resulting assembly. As noted, the frame assembly 690 also provides protection for components of the beveling tool 610 and particularly for the power unit 620. And, in certain versions, the frame assembly provides mounting or access provisions for a hand crank assembly described in greater detail herein.

In certain embodiments, timing lobes are provided between the swing arms to prevent misalignment within a multi-point linkage and ensure parallel movement between the guide rollers. Swing arm misalignment prevents consistent tracking and will create additional unwanted stress. The swing arms 670 include timing lobes collectively shown as 676 in FIG. 14.

Figure 14:
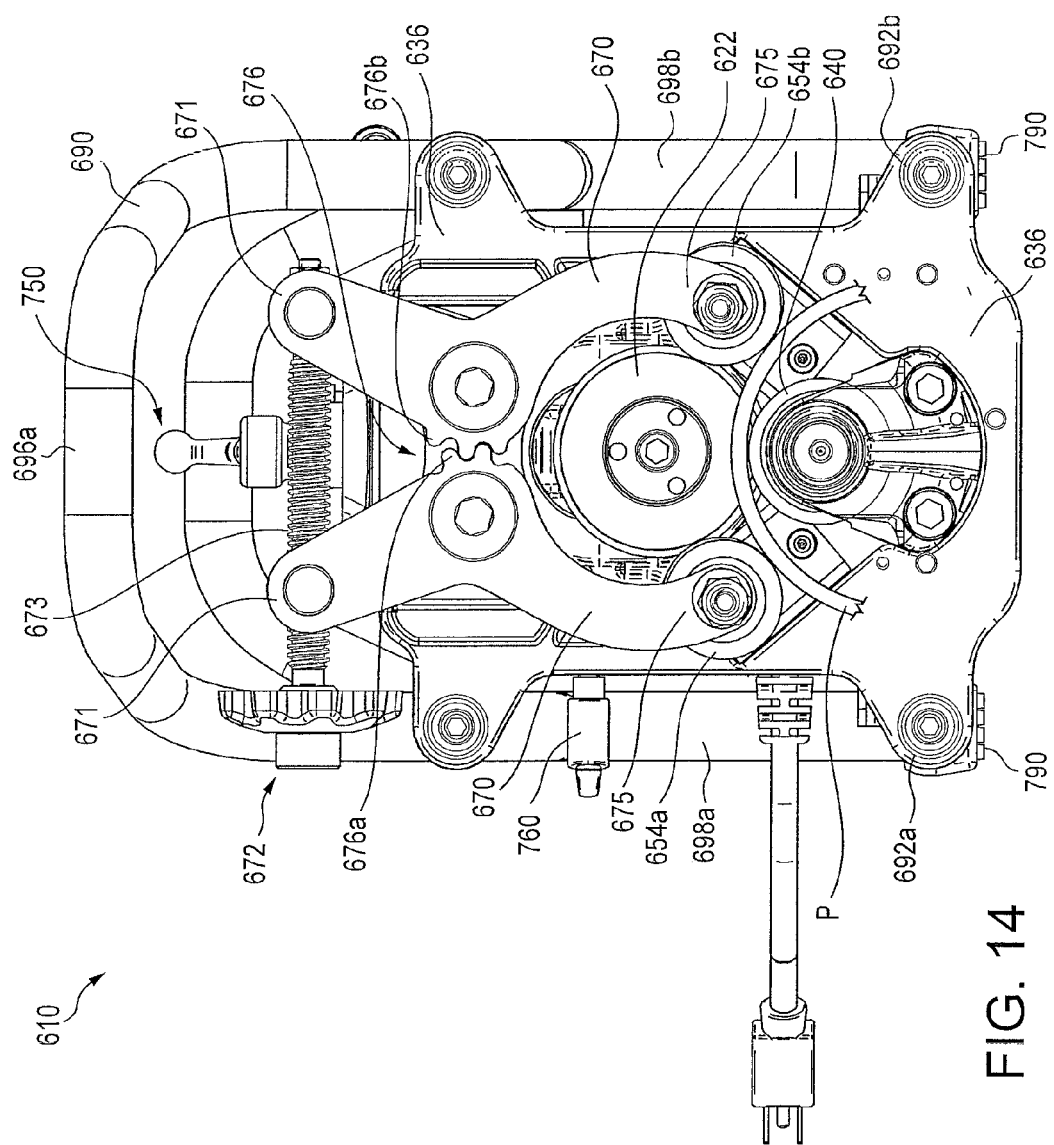
FIG. 14 is a front view of another embodiment of a beveling tool in accordance with the present subject matter.

Specifically, the swing arms 670 are illustrated in FIG. 14. Each swing arm includes a first end 671 and a second end 675. The guide rollers 654a, 654b are rotatably affixed to the second ends 675 of the swing arms 670. As will be appreciated, rotation of a threaded member 673 of the feed screw assembly 672 results in linear displacement of the first ends 671 of the swing arms 670 engaged therewith. Thus, upon rotation of the threaded member 673 in one direction, the first ends 671 of the swing arms 670 are displaced toward one another, thereby resulting in displacement of the second ends 675 away from one another. And, upon rotation of the threaded member 673 in an opposite direction, the first ends 671 of the swing arms 670 are displaced away from one another, thereby resulting in displacement of the second ends 675 toward one another. It will be appreciated that this arrangement could be reversed.

Each swing arm 670 includes one or more timing lobes 676 as best shown in FIG. 14. Specifically, the swing arm 670 carrying the guide roller 654a includes one or more timing lobes 676a. And the swing arm 670 carrying the guide roller 654b includes one or more timing lobes 676b. The timing lobes 676a and 676b are directed toward and facing one another. Each timing lobe 676a is separated by a recessed region that is sized and shaped to receive and engage one of the timing lobes 676b. And, each timing lobe 676b is separated by a recessed region that is sized and shaped to receive and engage one of the timing lobes 676a. The timing lobes 676a, 676b engage one another in a meshed gear engagement fashion and function to promote symmetrical positioning between the swing arms 670. Although the timing lobes 676 are utilized in the tool 610, it will be appreciated that the present subject matter includes a wide array of assemblies and configurations for governing movement of the swing arms. Furthermore, the present subject matter includes beveling tools that do not utilize timing lobes or any such provisions for governing movement of the swing arms.

Consistent tracking of the tool along an edge of a workpiece is a significant feature of the tool. As previously described, a single diameter drive roller with a helical knurl or a stepped knurled drive roller is provided that is imprinted or otherwise formed with a diamond knurling pattern to grip the material and drive the tool along an edge of the workpiece. The stepped configuration can be provided in multiple, and particularly three sequential or adjacent circumferential regions, with the largest diameter located closest to the faceplate. The largest diameter ring moves with an angular velocity greater than the smallest diameter ring. The difference in the surface speeds of the different steps urges the tool to track during operation. The drive roller accomplishes this tracking by rotating the tool axially in a clockwise direction, effectively forcing the leading edge of the tool into the workpiece.

Specifically, the drive roller 640 can be a single diameter drive roller having an outer knurled or roughened surface. Alternatively, the drive roller 640 can be a stepped knurled drive roller, that includes a plurality of regions, each differing in diameter, and concentrically arranged about a common central axis of rotation. The drive roller 640 can utilize the same or a similar configuration as previously described with regard to the tool 210. The present subject matter includes a wide array of configurations for the drive roller 640. For example, the number of steps or regions can be greater than three, or less than three. Furthermore, it is also contemplated that the drive roller 640 could be provided in non-cylindrical shapes and forms for example having a cone or frustoconical shape. Furthermore, the drive roller 640 can include a wide range of knurling patterns. It is contemplated that nearly any surface roughening or modification technique can be used to increase friction or gripping between the guide roller and a workpiece. For example, helical knurling pattern(s) could be formed or produced on the drive roller. Alternatively, a combination of a helical knurling pattern and a diamond knurling pattern could be used.

Upon mounting the tool to a workpiece, due to a majority of the tool's weight being cantilevered off the edge of the workpiece, there may be a need for other means of tracking. In certain applications, in order to provide the additional force needed for consistent tracking, the track or guide rollers are crowned and skewed at a predetermined angle.

More specifically, in certain embodiments of the present subject matter, the guide rollers 654a, 654b, are skewed to facilitate or further promote tracking between the tool 610 and a workpiece placed therein. The guide rollers 654a, 654b can utilize a similar configuration as the guide rollers 254a, 254b described in conjunction with the tool 210.

In certain embodiments, each of the guide rollers 654a and 654b is crowned as previously described herein. However, in other embodiments, the present subject matter includes the use of guide rollers 654a, 654b having faces that are flat. In those embodiments, the guide rollers are cylindrical in shape and so when viewed in cross section, their face which contacts a workpiece is flat or substantially so.

The tool 610 can be manually driven around a pipe by an operator with a hand crank 740. The hand crank is connected to a hand crank extension which transmits rotary motion through a reduced speed hand crank gear box before connecting to the drive roller. As previously noted, the hand crank can be releasably engageable with the tool. A one-way clutch bearing rides along the input shaft, which prevents the user from driving the tool in the wrong direction. The one-way clutch bearing could be of a ratchet type design to allow only one rotational direction. The present subject matter also includes the use of motorized or powered drives instead of, or in addition to, the hand crank. For example, an electric motor could be used to power rotation of the drive roller.

Specifically, the beveling tool 610 also comprises a hand crank assembly 740 including a hand crank extension assembly 742 and a reducing gear assembly 744. The gear assembly 744 rotates the drive roller 640. The hand crank extension assembly 742 includes one or more members for transferring rotary movement or power to the gear assembly 744. The assembly 742 typically includes a ratcheting wrench or other component to facilitate an operator applying rotary power to the gear assembly 744. One or more movement controlling provisions such as a one-way clutch bearing can be used in the gear drivetrain or the extension assembly 742 to prevent a user from driving the tool 610 in an improper direction. The present subject matter also includes the use of quick release assemblies for engaging the ratcheting wrench, drive motor, or other component(s) to the gear assembly 744.

Figure 15:
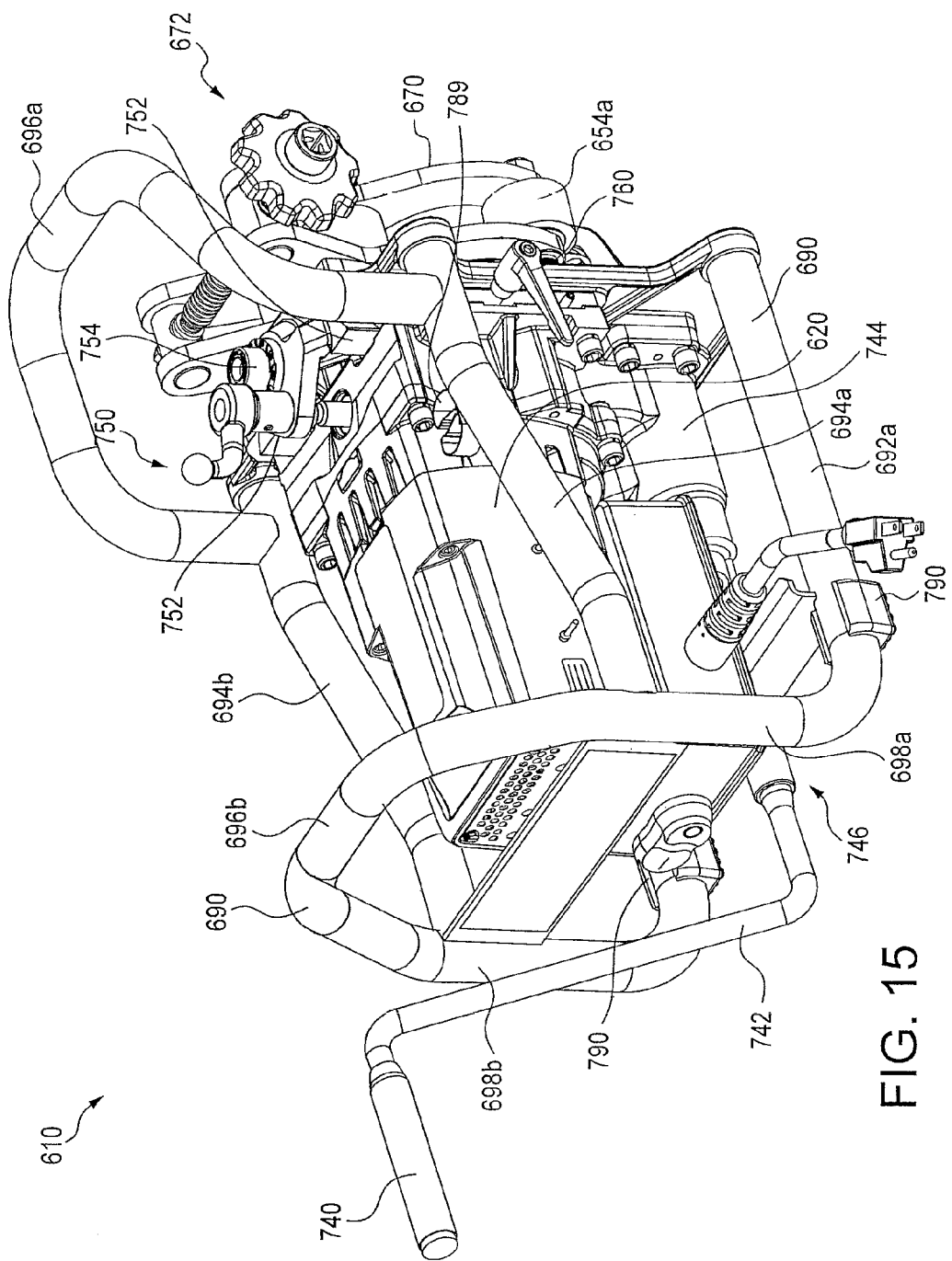
FIG. 15 is a perspective view of the beveling tool shown in FIG. 14.
Figure 16:
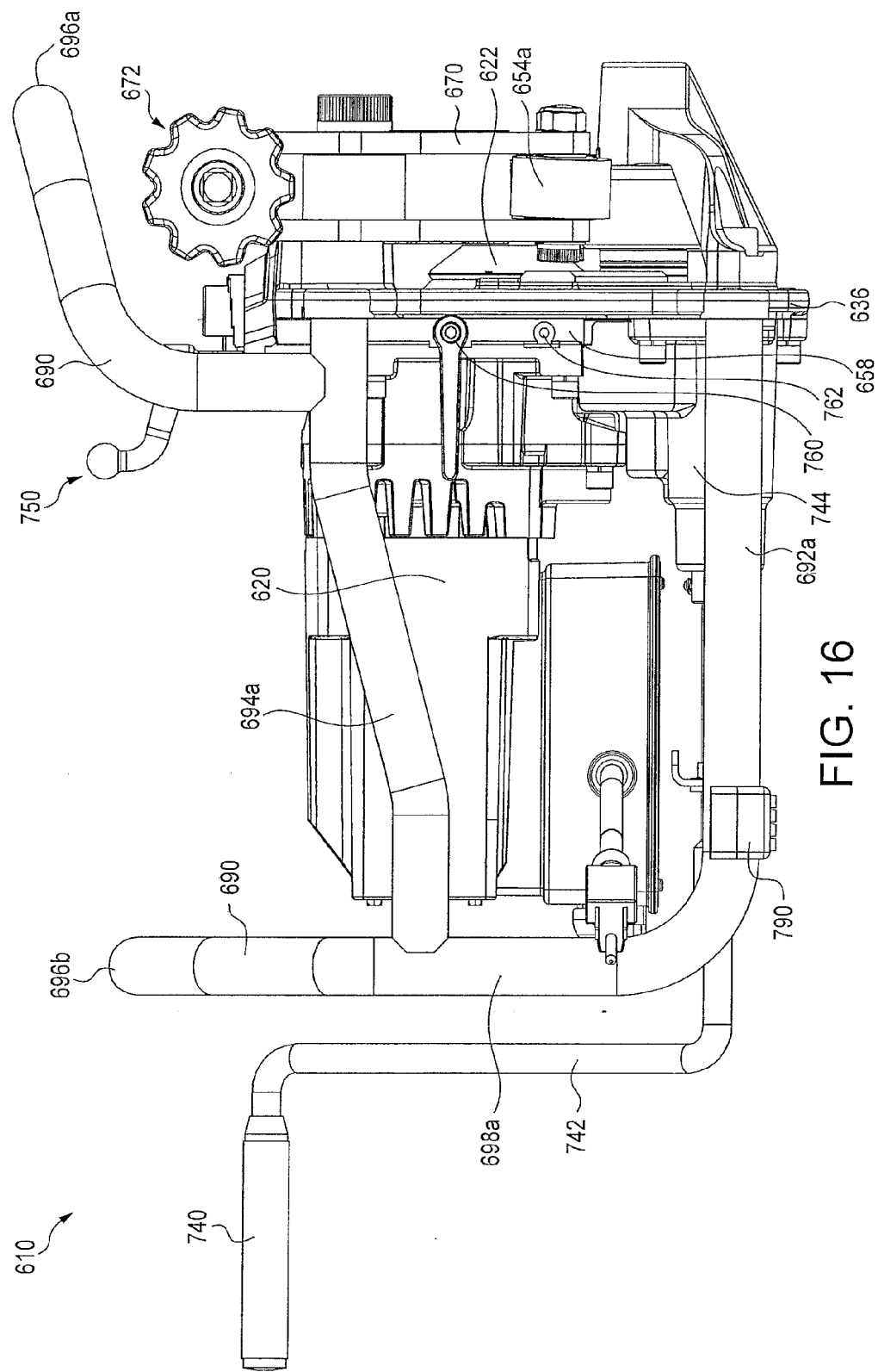
FIG. 16 is a side elevational view of the beveling tool illustrated in FIGS. 14-15.
Figure 17:
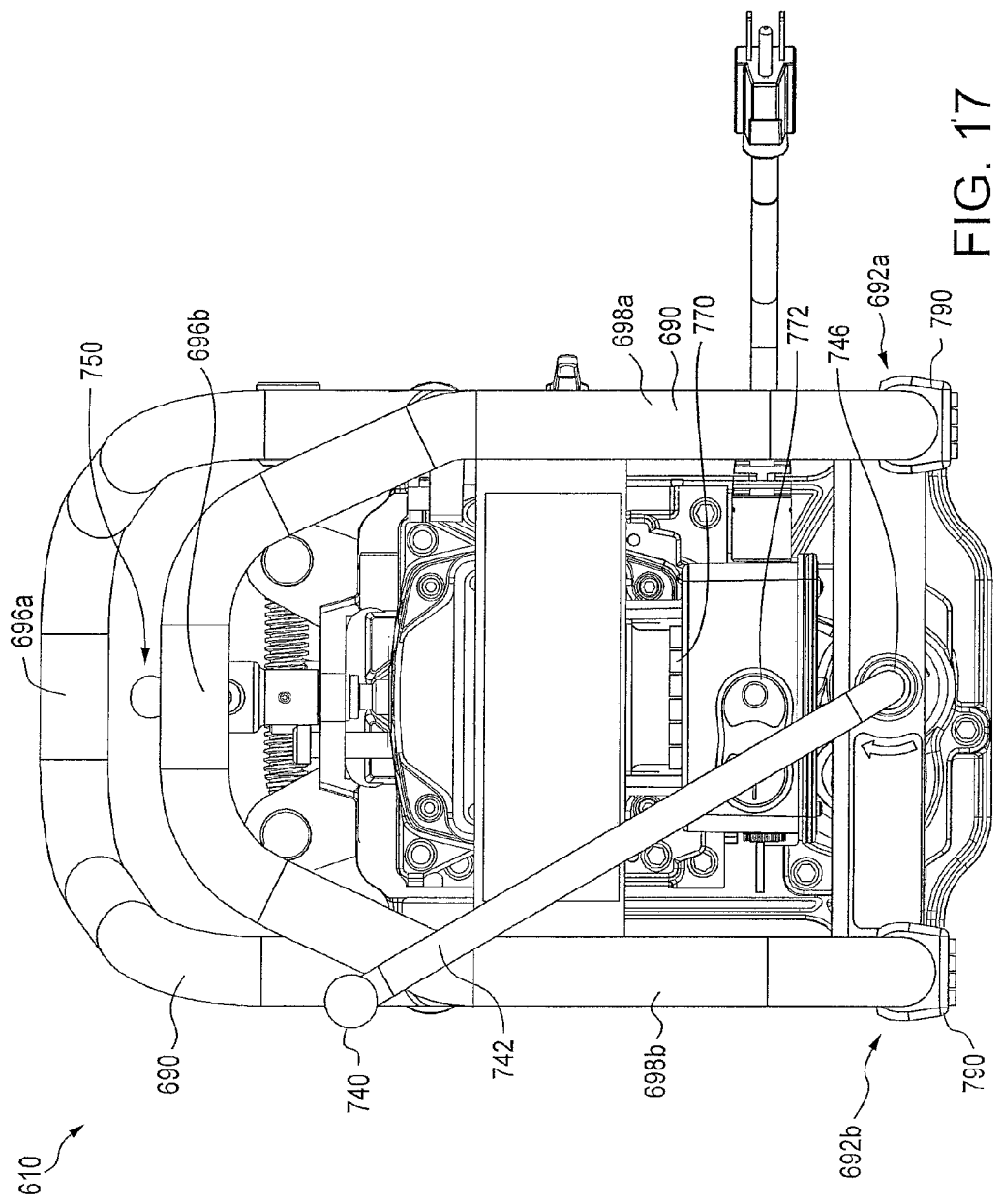
FIG. 17 is a rear view of the beveling tool illustrated in FIGS. 14-16.

FIGS. 15 and 17 illustrate the tool 610 having a quick release or "quick disconnect" assembly 746 at which a drive such as a hand crank can be engaged for applying rotary power to the gear assembly 744 and the drive roller 640. The quick disconnect assembly 746 is located along a region of the tool 610 to provide an operator with a convenient location for attaching a drive component. For certain embodiments, a detachable hand crank 740, 742 is provided which includes an end configured for engagement with the quick disconnect assembly 746. One or more mounting brackets can be provided on the tool to retain and/or store the hand crank 740, 742 when detached or disengaged from the assembly 746. For example, one or more spring clips 789 or polymeric retainers can be provided on the frame which receive and retain the hand crank when the hand crank is disengaged from the tool. The clip is configured to releasably retain a hand crank when the crank is disengaged from the tool.

As previously noted, a powered drive such as a secondary variable speed motor can be engaged with the drive roller 640, and particularly via the quick disconnect assembly 746. This provides an operator with an option of using motorized driving of the tool. That is, if the operator would prefer to power the tool around a pipe or other workpiece rather than manually driving the tool by use of the hand crank 740, 742 or wrench, the quick disconnect assembly 746 provides a convenient and readily accessible location for attachment of a motor, crank, or wrench.

In certain embodiments, the power unit or motor sub-assembly is vertically positionable along dovetail rail guides with a cutter engagement feed screw. A stepped land-width adjustment can be used to control the amount of travel the tool can move downward. After a shoulder screw bottoms out, a gib plate locking screw is tightened against the gib plate in order to hold the motor sub-assembly fixed during milling.

More specifically, in certain embodiments of the tool, provisions for selectively positioning the milling head 622 are provided in the tool 610. For example and as best depicted in FIGS. 14 and 15, the power unit 620 and milling head 622 are selectively vertically positioned along the faceplate 636 by adjustment of a cutter engagement feed screw assembly 750. One or more dovetail rail guides 752 can be provided along a rear face or portion of the faceplate 636 which serve to limit lateral or other movement besides vertical movement between the power unit 620 and the faceplate 636. A stepped land width adjustment assembly 754 can be used to control the extent of vertical movement and particularly provide an end stop for movement of the power unit 620 relative to the faceplate 636. A shoulder screw (not shown) can be used to limit vertical displacement and particularly that of the power unit 620 or a gib plate 658 (FIG. 16) to which the power unit 620 is affixed. A gib plate locking screw 760 is utilized that engages the gib plate 658 to the faceplate 636 during milling or other operation. Upon selection of a desired position for the milling head 622, the gib plate locking screw 760 is tightened to maintain that position. In certain versions, the screw 760 includes a handle that enables the screw to be pulled axially and repositioned to a new position for improved grasping. One or more gib plate fine adjustment screws such as screws 762 can be provided along the gib plate 658 to provide relatively fine positional adjustment of the milling head 622 relative to the faceplate 636. Additional details of the feed screw assembly, the stepped land width adjustment, and/or gib plate locking screw are as previously described with regard to those components depicted in the embodiment shown in FIG. 7.

The beveling tool 610 can include a wide array of features and the like. A current draw indicator such as an LED display 770 can be provided to assist an operator in controlling the rate of feed to the milling head 622, i.e., the rate of travel between the tool and the workpiece which is the result of the operator applying power via the hand crank assembly 740. A wide array of indicators can be used for the display 770 including different color LEDs or certain arrangements to indicate to an operator whether to reduce or increase the feed rate.

The beveling tool 610 may also include an on/off switch 772 which can be in a variety of different forms and configurations. Biasing provisions can be used to urge the switch to a desired position depending upon the motor actuation circuit.

The beveling tool 610 can include additional components such as vibration dampening and/or grip-promoting rubber feet 790. In particular embodiments, rubber feet placed near the backside of the tubular frame 690 give the tool a platform to rest on when not in use. Placing rubber feet on a particular side of tool gives the operator a clear indication of how the tool was intended to be stored.

During operation, the beveling tool rotates 360° or substantially so while the electrical cord wraps itself around the frame. During operation the cord may slide off of the rear of the tubular frame when the tool is in an inverted position. The electrical cord can potentially interfere with the hand crank, thereby requiring the user to pause cranking and reposition the electrical cord into a better location. The rubber feet create a barrier near the rear of the tubular frame that reduces the potential for the electrical cord from interfering with the hand crank.

Figure 10:
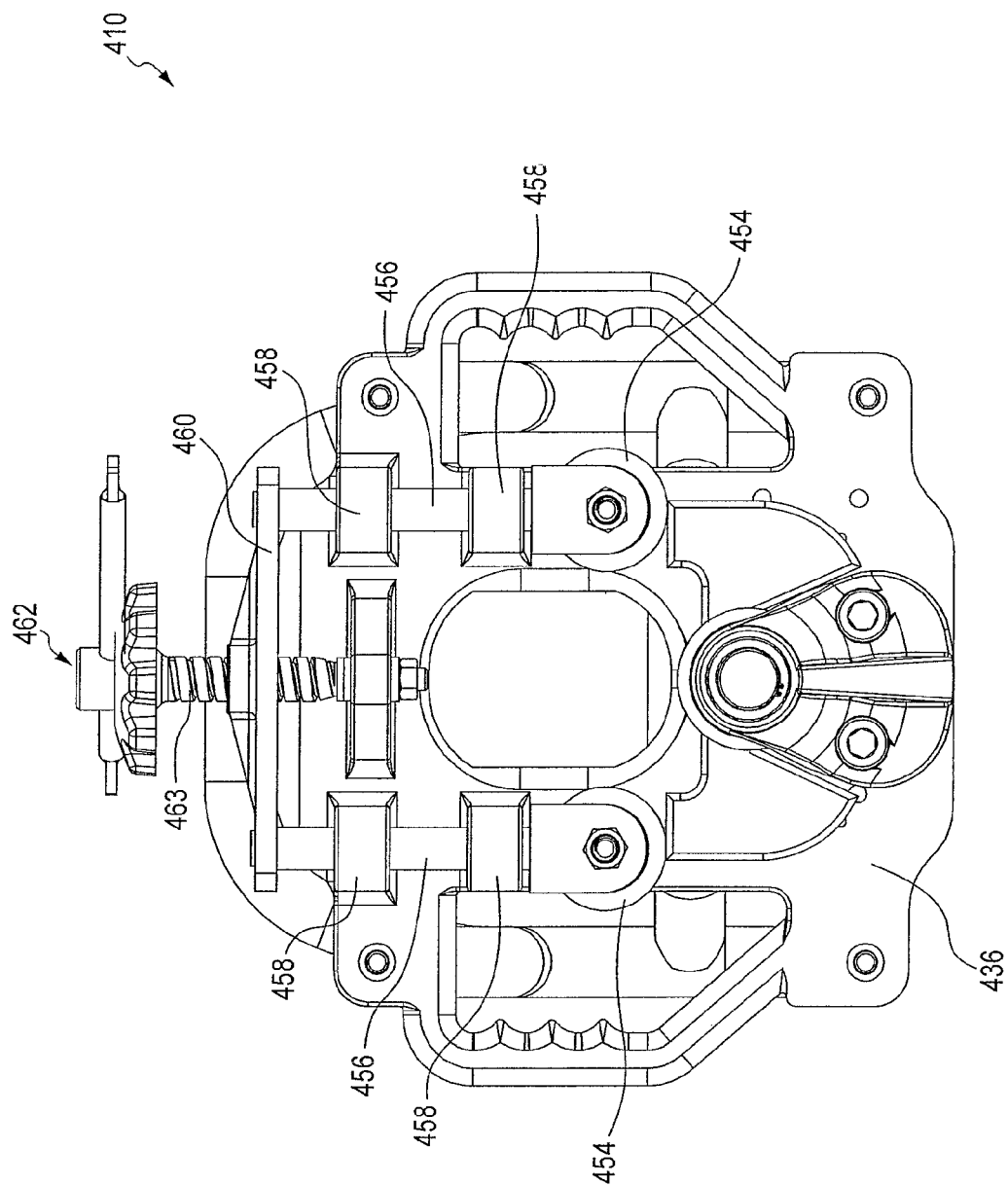
FIG. 10 is an end view of another embodiment of a beveling tool in accordance with the present subject matter.
Figure 11:
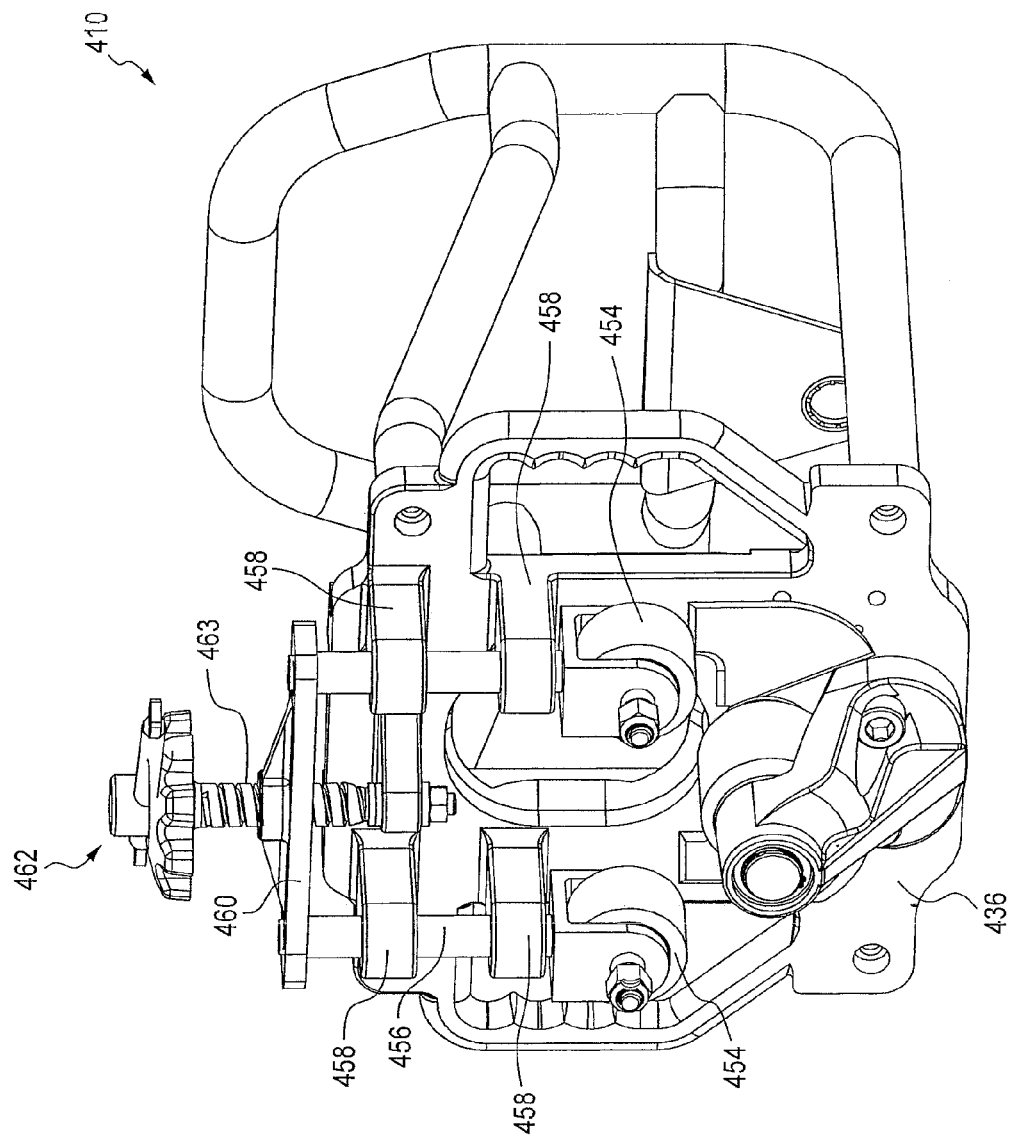
FIG. 11 is a detailed view of a guide bar mounting system used in the beveling tool of FIG. 10 in accordance with the present subject matter.

The present subject matter provides a wide array of features and configurations for the beveling tools. For example, in certain versions of the tools, the swing arms such as swing arms 270 of the tool 210 are replaced with a guide bar mounting system to engage a workpiece. Referring to FIGS. 10 and 11, a beveling tool 410 is shown without a power unit, such as without the power unit 220 of the tool 210. The tool 410 includes a pair of guide rollers 454 which are supported on corresponding guide bars 456. Each guide bar is linearly positionable between supports 458 which can be cast or otherwise formed along a frontwardly directed region of a faceplate 436. The guide bars 456 are engaged with a guide bar plate 460 or other member. The plate 460 is threadedly engaged with a guide bar adjustment assembly collectively shown as 462. The assembly 462 includes a threaded member 463. As will be understood, upon rotation of the member 463, the linear position of the rollers 454 is adjusted. The assembly 462 can include a positive clutch assembly as previously described herein with regards to FIGS. 3-6. In certain versions of the beveling tool 410, the guide bars 456 can be skewed to as described herein to improve tracking performance by the guide rollers 454.

As previously noted, in certain embodiments of the beveling tool, a one-way clutch and particularly a one-way clutch bearing is included in the hand crank assembly, and particularly in association with the reducing gear assembly. For example, a one-way clutch bearing can be incorporated in the reducing gear assembly 344 of the beveling tool 210 or in the reducing gear assembly 744 of the beveling tool 610. One-way clutch bearing assemblies are known in the art however, not in association with the present subject matter beveling tools. A one-way clutch bearing ensures that the tool is driven by the hand crank in only one direction. This in turn ensures that the tracking features function properly and that a user removes material in an intended milling fashion and not via a "climb milling" operation as known in the art. If the beveling tool was allowed to climb mill, the tool and specifically the milling head and associated cutting inserts could excessively "bite" into the material, i.e., a pipe end, and result in unintended displacement of the tool relative to the material. Thus, the one-way clutch assembly is configured to prevent climb milling and promote tracking of the tool as a user drives the tool by the hand crank.

Another feature of the present subject matter beveling tools is that the beveling tools utilize a single drive roller that is positioned within an interior region of a pipe such as shown in FIGS. 8 and 14. Specifically, the guide roller assembly and the drive roller are configured such that upon positioning an end of a pipe between the pair of guide rollers and the drive roller, the drive roller is positioned within an interior region of the pipe and the guide rollers can contact an outer surface of the pipe. The particular configuration of using two guide rollers that contact an outer surface of a pipe and a single roller that contacts an inner surface of the pipe enables relatively small pipe diameters to be beveled using the tools described herein.

Many other benefits will no doubt become apparent from future application and development of this technology.

All patents, applications, references, and articles noted herein are hereby incorporated by reference in their entirety.

It will be understood that any one or more feature or component of one embodiment described herein can be combined with one or more other features or components of another embodiment. Thus, the present subject matter includes any and all combinations of components or features of the embodiments described herein.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A powered beveling tool comprising:
a power unit including an electric motor;
a frame assembly supporting the power unit;
a faceplate engaged to the frame and defining a frontwardly directed front face;
a milling head rotatably powered by the power unit, the milling head exposed along the front face of the faceplate;
a guide roller assembly including a pair of guide rollers and provisions for adjustably positioning the guide rollers, the guide rollers located along the front face of the faceplate;
a drive roller assembly including a drive roller and provisions for rotating the drive roller, the drive roller located along the front face of the faceplate;
wherein the guide roller assembly and the drive roller are configured such that upon positioning an end of a pipe between the pair of guide rollers and the drive roller, the drive roller is positioned within an interior region of the pipe and the guide rollers can contact an outer surface of the pipe;
wherein the provisions for adjustably positioning the guide rollers include (i) a pair of swing arms and (ii) a swing arm assembly engaged with the pair of swing arms for adjusting the position of the swing arms, each swing arm defining a distal arm end at which is attached one of the pair of guide rollers, the swing arms pivotally engaged with one another.

2. The beveling tool of claim 1 wherein the provisions for adjustably positioning the guide rollers further include timing lobes engaged with the pair of swing arms.

3. The beveling tool of claim 1 wherein each of the pair of guide rollers is crowned.

4. The beveling tool of claim 1 wherein each of the pair of guide rollers is skewed.

5. The beveling tool of claim 1 wherein the drive roller is knurled.

6. The beveling tool of claim 5 wherein the knurl is a 60° helical knurl.

7. The beveling tool of claim 1 wherein the frame includes an upper frame member that includes a handle.

8. The beveling tool of claim 7 wherein the frame provides a side and rear mount handle configuration.

9. The beveling tool of claim 1 wherein the provisions for rotating the drive roller include a hand crank assembly.

10. The beveling tool of claim 9 wherein the provisions for rotating the drive roller include a one-way clutch bearing.

11. The beveling tool of claim 9 wherein the hand crank assembly is releasably engageable with the beveling tool and upon engagement and rotation of the hand crank assembly, the drive roller is rotated.

12. The beveling tool of claim 1 further comprising:
provisions for adjusting the position of the milling head relative to the faceplate.

13. The beveling tool of claim 12 wherein the provisions for adjusting the position of the milling head include a cutter engagement feed screw assembly.

14. The beveling tool of claim 12 wherein the provisions for adjusting the position of the milling head include one or more dovetail rail guides.

15. The beveling tool of claim 12 wherein the provisions for adjusting the position of the milling head include at least one of (i) a stepped land width adjustment assembly, (ii) a shoulder screw engageable with a gib plate to which the power unit is affixed, (iii) a gib plate locking screw engageable with the gib plate, (iv) one or more gib plate fine adjustment screws, and (v) combinations of (i)-(iv).

16. The beveling tool of claim 1 further comprising:
a current draw indicator to provide visual indication and assist in assessing a rate of feed to the milling head.

17. The beveling tool of claim 1 further comprising:
at least one clip on the frame assembly, wherein the clip is configured to releasably retain a hand crank that is disengaged form the tool.

18. The beveling tool of claim 1 wherein the milling head comprises a frustoconically shaped head and a rearward base, the milling head defining a centrally located and axially extending bore for receiving a drive spindle that transmits rotary power from the power unit.

19. The beveling tool of claim 18 wherein the milling head further comprises at least one cutting insert.

20. The beveling tool of claim 19 wherein the frustoconically shaped head defines a frontwardly directed sloped surface and the milling head defines at least one recess along the sloped surface, and the at least one cutting insert is releasably retained within the recess.

21. The beveling tool of claim 19 wherein the milling head comprises a plurality of inserts and at least two of the inserts are radially offset relative to one another.

22. The beveling tool of claim 18 wherein the milling head defines at least two apertures along a front face of the milling head which are adapted to receive a two pin spanner wrench.

23. A powered beveling tool comprising:
a power unit including an electric motor;
an external frame extending about the power unit and supporting the power unit therein;
a faceplate engaged to the frame and defining a frontwardly directed front face;
a milling head rotatably powered by the power unit, the milling head exposed along the front face of the faceplate, wherein the milling head comprises a frustoconically shaped head and a rearward base, the milling head defining a centrally located and axially extending bore for receiving a drive spindle that transmits rotary power from the power unit;
a guide roller assembly including a pair of guide rollers and provisions for adjustably positioning the guide rollers, the guide rollers located along the front face of the faceplate;
a drive roller assembly including a drive roller and provisions for rotating the drive roller, the drive roller located along the front face of the faceplate;
wherein the provisions for adjustably positioning the guide rollers include (i) a pair of swing arms and (ii) a swing arm assembly engaged with the pair of swing arms for adjusting the position of the swing arms, each swing arm defining a distal arm end at which is attached one of the pair of guide rollers, the swing arms pivotally engaged with one another.

24. The beveling tool of claim 23 wherein the milling head further comprises at least one cutting insert.

25. The beveling tool of claim 24 wherein the frustoconically shaped head defines a frontwardly directed sloped surface and the milling head defines at least one recess along the sloped surface, and the at least one cutting insert is releasably retained within the recess.

26. The beveling tool of claim 24 wherein the milling head comprises a plurality of inserts and at least two of the inserts are radially offset relative to one another.

27. The beveling tool of claim 23 wherein the milling head defines at least two apertures along a front face of the milling head which are adapted to receive a two pin spanner wrench.

28. The beveling tool of claim 23 wherein the provisions for adjustably positioning the guide rollers further includes (iii) timing lobes engaged with the pair of swing arms.

29. The beveling tool of claim 23 wherein each of the pair of guide rollers is crowned.

30. The beveling tool of claim 23 wherein each of the pair of guide rollers is skewed.

31. The beveling tool of claim 23 wherein the drive roller is knurled.

32. The beveling tool of claim 31 wherein the knurl is a 60° helical knurl.

33. The beveling tool of claim 23 wherein the external frame includes an upper frame member that includes at least one handle.

34. The beveling tool of claim 33 wherein the frame provides a side and rear mount handle configuration.

35. The beveling tool of claim 23 wherein the provisions for rotating the drive roller include a hand crank assembly.

36. The beveling tool of claim 35 wherein the provisions for rotating the drive roller include a one-way clutch bearing.

37. The beveling tool of claim 35 wherein the hand crank assembly is releasably engageable with the beveling tool and upon engagement and rotation of the hand crank assembly, the drive roller is rotated.

38. The beveling tool of claim 23 further comprising:
provisions for adjusting the position of the milling head relative to the faceplate.

39. The beveling tool of claim 38 wherein the provisions for adjusting the position of the milling head include a cutter engagement feed screw assembly.

40. The beveling tool of claim 38 wherein the provisions for adjusting the position of the milling head include one or more dovetail rail guides.

41. The beveling tool of claim 38 wherein the provisions for adjusting the position of the milling head include at least one of (i) a stepped land width adjustment assembly, (ii) a shoulder screw engageable with a gib plate to which the power unit is affixed, (iii) a gib plate locking screw engageable with the gib plate, (iv) one or more gib plate fine adjustment screws, and (v) combinations of (i)-(iv).

42. The beveling tool of claim 23 further comprising:
a current draw indicator to provide visual indication and assist in assessing a rate of feed to the milling head.

43. The beveling tool of claim 23 further comprising:
at least one clip on the frame, wherein the clip is configured to releasably retain a hand crank that is disengaged from the tool.

44. The beveling tool of claim 23 wherein the guide roller assembly and the drive roller are configured such that upon positioning an end of a pipe between the pair of guide rollers and the drive roller, the drive roller is positioned within an interior region of the pipe and the guide rollers can contact an outer surface of the pipe.

45. A powered beveling tool comprising:
a power unit including an electric motor;
an external frame extending about the power unit and supporting the power unit therein;
a faceplate engaged to the frame and defining a frontwardly directed front face;
a milling head rotatably powered by the power unit, the milling head exposed along the front face of the faceplate;
a drive roller assembly including a drive roller and provisions for rotating the drive roller, the drive roller located along the front face of the faceplate;
a guide roller assembly including (i) a pair of swing arms, (ii) a pair of guide rollers, each roller rotatably mounted proximate an end of a respective swing arm, and (iii) a swing arm feed screw assembly engaged with the pair of swing arms for selectively adjusting the position of the swing arms, the swing arms being pivotally engaged with one another and the pair of guide rollers located along the front face of the faceplate.

46. The beveling tool of claim 45 wherein the milling head comprises a frustoconically shaped head and a rearward base, the milling head defining a centrally located and axially extending bore for receiving a drive spindle that transmits rotary power from the power unit.

47. The beveling tool of claim 46 wherein the milling head further comprises at least one cutting insert.

48. The beveling tool of claim 47 wherein the frustoconically shaped head defines a frontwardly directed sloped surface and the milling head defines at least one recess along the sloped surface, and the at least one cutting insert is releasably retained within the recess.

49. The beveling tool of claim 47 wherein the milling head comprises a plurality of inserts and at least two of the inserts are radially offset relative to one another.

50. The beveling tool of claim 46 wherein the milling head defines at least two apertures along a front face of the milling head which are adapted to receive a two pin spanner wrench.

51. The beveling tool of claim 45 wherein the guide roller assembly further includes timing lobes engaged with the pair of swing arms.

52. The beveling tool of claim 45 wherein each of the pair of guide rollers is crowned.

53. The beveling tool of claim 45 wherein each of the pair of guide rollers is skewed.

54. The beveling tool of claim 45 wherein the drive roller is knurled.

55. The beveling tool of claim 54 wherein the knurl is a 60° helical knurl.

56. The beveling tool of claim 45 wherein the external frame includes at least one upper frame member that includes a handle.

57. The beveling tool of claim 45 wherein the external frame provides a side and rear mount handle configuration.

58. The beveling tool of claim 45 wherein the provisions for rotating the drive roller include a hand crank assembly.

59. The beveling tool of claim 58 wherein the provisions for rotating the drive roller include a one-way clutch bearing.

60. The beveling tool of claim 58 wherein the hand crank assembly is releasably engageable with the beveling tool and upon engagement and rotation of the hand crank assembly, the drive roller is rotated.

61. The beveling tool of claim 45 further comprising:
provisions for adjusting the position of the milling head relative to the faceplate.

62. The beveling tool of claim 61 wherein the provisions for adjusting the position of the milling head include a cutter engagement feed screw assembly.

63. The beveling tool of claim 61 wherein the provisions for adjusting the position of the milling head include one or more dovetail rail guides.

64. The beveling tool of claim 61 wherein the provisions for adjusting the position of the milling head include at least one of (i) a stepped land width adjustment assembly, (ii) a shoulder screw engageable with a gib plate to which the power unit is affixed, (iii) a gib plate locking screw engageable with the gib plate, (iv) one or more gib plate fine adjustment screws, and (v) combinations of (i)-(iv).

65. The beveling tool of claim 45 further comprising:
a current draw indicator to provide visual indication and assist in assessing a rate of feed to the milling head.

66. The beveling tool of claim 45 further comprising:
at least one clip on the external frame, wherein the clip is configured to releasably retain a hand crank that is disengaged form the tool.

67. The beveling tool of claim 45 wherein the guide roller assembly and the drive roller are configured such that upon positioning an end of a pipe between the pair of guide rollers and the drive roller, the drive roller is positioned within an interior region of the pipe and the guide rollers can contact an outer surface of the pipe.

* * * * *